US010235296B2

(12) United States Patent
Ivanov et al.

(10) Patent No.: US 10,235,296 B2
(45) Date of Patent: Mar. 19, 2019

(54) DISTRIBUTION AND EXECUTION OF INSTRUCTIONS IN A DISTRIBUTED COMPUTING ENVIRONMENT

(71) Applicant: VMware, Inc., Palo Alto, CA (US)

(72) Inventors: Dimitar Ivanov, Sofia (BG); Alexander Stoyanov, Sofia (BG); George Dmitriov, Sofia (BG); Anna Delcheva, Sofia (BG); Dimitar Hristov Barfonchovski, Sofia (BG)

(73) Assignee: VMware, Inc., Palo Alto, CA (US)

( * ) Notice: Subject to any disclaimer, the term of this patent is extended or adjusted under 35 U.S.C. 154(b) by 50 days.

(21) Appl. No.: 15/370,790

(22) Filed: Dec. 6, 2016

(65) Prior Publication Data

US 2018/0157592 A1    Jun. 7, 2018

(51) Int. Cl.
*G06F 8/60* (2018.01)
*G06F 9/50* (2006.01)
*G06F 12/0875* (2016.01)

(52) U.S. Cl.
CPC ............ *G06F 12/0875* (2013.01); *G06F 8/60* (2013.01); *G06F 9/5072* (2013.01); *G06F 2212/452* (2013.01)

(58) Field of Classification Search
None
See application file for complete search history.

(56) References Cited

U.S. PATENT DOCUMENTS

| | | | | |
|---|---|---|---|---|
| 2008/0098160 A1* | 4/2008 | Slyz | ....................... | G06F 8/658 711/103 |
| 2017/0329612 A1* | 11/2017 | Ragupathi | ................. | G06F 8/65 |
| 2017/0339213 A1* | 11/2017 | Dukatz | .................... | G06N 5/02 |

* cited by examiner

*Primary Examiner* — Sisley N Kim
(74) *Attorney, Agent, or Firm* — Hanley, Flight & Zimmerman, LLC

(57) ABSTRACT

Methods and apparatus for distribution and execution of instructions in a distributed computing environment are disclosed. An example method includes accessing, by executing a first instruction with a processor implementing a management agent within a deployment environment, an indication of a second instruction to be executed, the indication of the second instruction to be executed provided by a management endpoint within the deployment environment. A package supporting execution of the instruction is requested from the management endpoint. A component of the package is loaded into a command cache. The component of the package includes the second instruction to be executed. The command cache is implemented by a plug in framework. The second instruction is executed from the command cache. A result of the execution of the second instruction is collected. The result of the execution of the second instruction is transmitted to the management endpoint.

21 Claims, 13 Drawing Sheets

DISTRIBUTION AND EXECUTION OF INSTRUCTIONS IN A DISTRIBUTED COMPUTING ENVIRONMENT

FIELD OF THE DISCLOSURE

The present disclosure relates generally to cloud computing and, more particularly, to methods and apparatus to distribution and execution of instructions in a distributed computing environment.

BACKGROUND

Virtualizing computer systems provides benefits such as the ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

DETAILED DESCRIPTION

Figure 1:
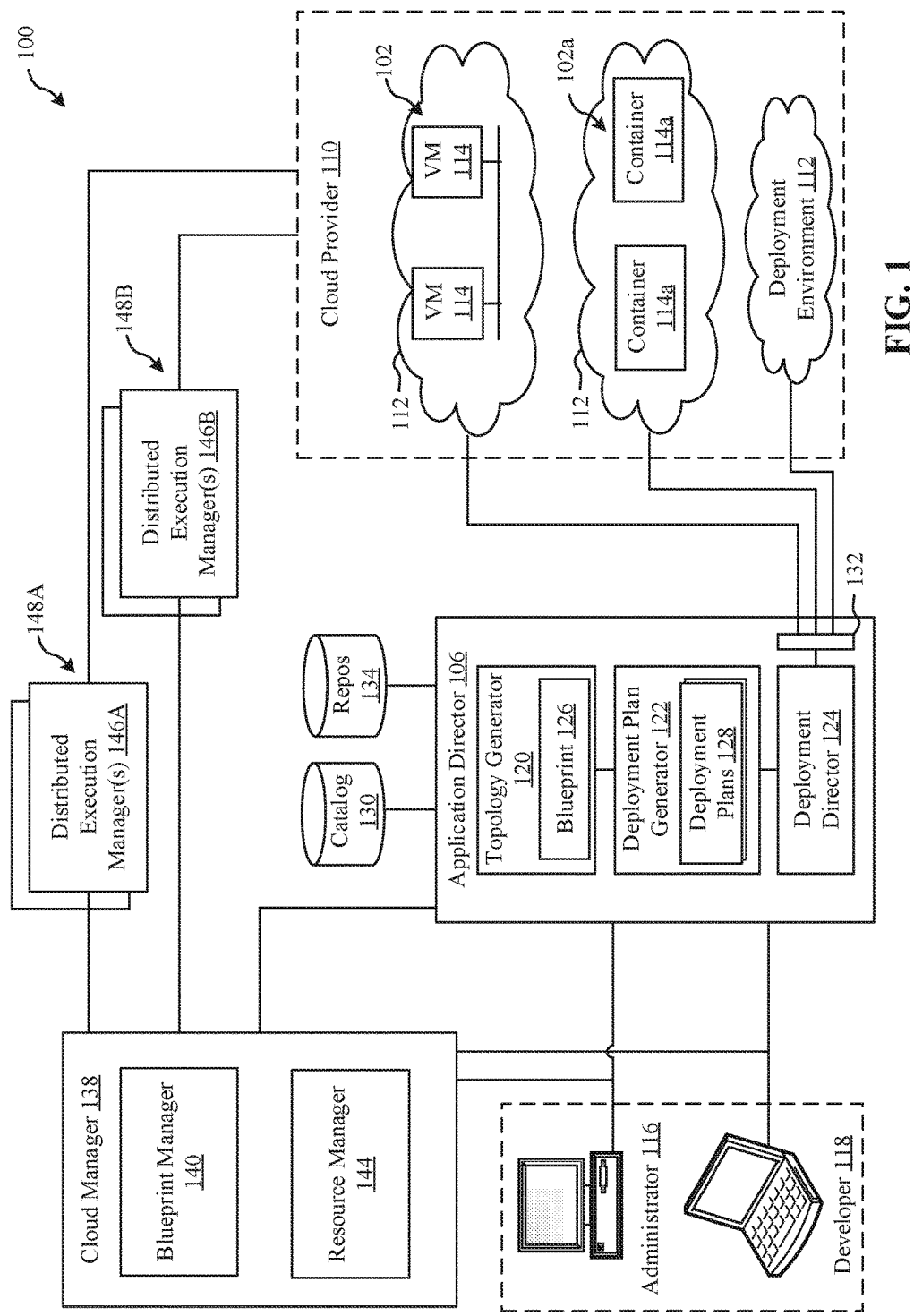
FIG. 1 depicts an example system constructed in accordance with the teachings of this disclosure for managing a cloud computing platform.

Cloud computing is based on the deployment of many physical resources across a network, virtualizing the physical resources into virtual resources, and provisioning the virtual resources for use across cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

Cloud computing platforms may provide many powerful capabilities for performing computing operations. However, taking advantage of these computing capabilities manually may be complex and/or require significant training and/or expertise. Prior techniques to providing cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein provide for automation of management tasks such as provisioning multiple virtual machines for a multiple-machine computing system (e.g., a group of servers that inter-operate), linking provisioned virtual machines and tasks to desired systems to execute those virtual machines or tasks, and/or reclaiming cloud computing resources that are no longer in use. The improvements to cloud management systems (e.g., the vCloud Automation Center (vCAC) from VMware®, the vRealize Automation Cloud Automation Software from VMware®), interfaces, portals, etc. disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In some examples, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Thus, a process executes within a container that isolates the process from other processes executing on the host operating system. Thus, operating system virtualization provides isolation and resource management capabilities without the resource overhead utilized by a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

FIG. 1 depicts an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device. etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vCloud Administrator Center™ (vCAC) and/or vRealize Automation™ (vRA) API and a vCloud Director™ API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file comprising dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, comprised of one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware (e.g., virtual computing hardware) utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 may communicate with a heterogeneous mixture of cloud provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and/or install particular instructions from a repository 134.

In some examples, the repository 134 is implemented by a file share. In some examples, the repository 134 is hosted by one or more VMs 114 within the deployment environment 112. In some examples, the repository 134 is implemented by one or more servers hosting files via a Server Message Block (SMB) share. Additionally or alternatively, files may be made available via the repository 134 using any other file sharing and/or networking protocol such as, file transfer protocol (FTP), HyperText Transfer Protocol (HTTP), Common Internet File System (CIFS), etc. In some examples, the repository 134 may be implemented outside of the deployment environment 112.

In the illustrated example of FIG. 1, a single repository 134 is shown. However, in some examples, multiple repositories located in the same or different locations may be utilized. For example, a first repository may be managed and/or operated by a third party organization (e.g., a professional service organization (PSO)) that manages and/or develops instructions (e.g., develops executable code, develops workflows, etc.) for use within the deployment environment 112, while a second repository may be managed and/or operated within the deployment environment 112. Using a repository managed and/or operated within the deployment environment enables the administrator 116 to prepare instructions (e.g., batch files, PowerShell™ commands, etc.) that can be subsequently distributed to management agents for execution.

As noted above, the repository 134 stores instructions for execution at one or more VMs 114. In some examples, the instructions are PowerShell™ commands and/or scripts (e.g., .PS1 files). However, any other type(s) and/or format(s) of instructions may additionally or alternatively be used. For example, the instructions may be executable instructions, archives of executable instructions, installers, batch files, scripts, etc.

In some examples, the instructions, when distributed to and/or executed by the VM 114, may cause one or component(s) of the VM114 to become updated. In this manner, the administrator 116 can efficiently upgrade and/or update components of the VMs 114 in bulk, rather than having to individually administer each VM 114. In some examples, prior approaches to upgrading components of multiple VMs 114 in the deployment environment 112 (e.g., tens of VMs, hundreds of VMs, etc.) might take an administrator days to complete. Utilizing the approaches disclosed herein where instructions for execution by a management agent of each VM 114 are administered and distributed via a centralized management endpoint reduces the amount of time required to perform such upgrades and/or updates.

The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scale) the deployment.

The example cloud manager 138 of FIG. 1 interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment.

The example blueprint manager 140 of the illustrated example manages the creation of multi-machine blueprints that define the attributes of multiple virtual machines as a single container that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine). Accordingly, the blueprint manager 140 facilitates more efficient management of multiple virtual machines than manually managing (e.g., deploying) virtual machine basic blueprints individually. The management of multi-machine blueprints is described in further detail in conjunction with FIG. 2.

The example blueprint manager 140 of FIG. 1 additionally annotates basic blueprints and/or multi-machine blueprints to control how workflows associated with the basic blueprints and/or multi-machine blueprints are executed. A workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with skills that can be performed by a DEM that is labeled with the same skill.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure.

Figure 2:
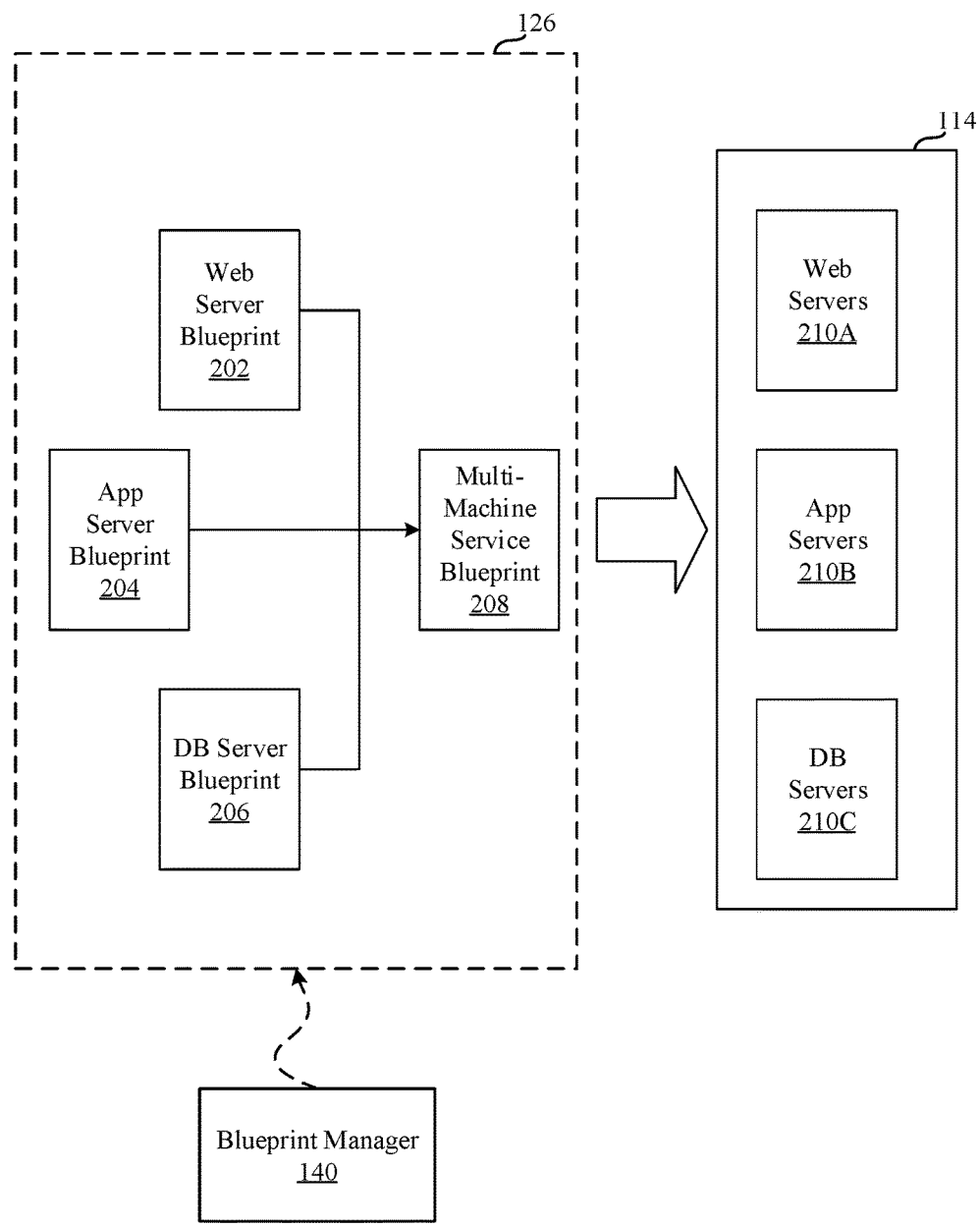
FIG. 2 illustrates an example generation of a multi-machine blueprint by the example blueprint manager of FIG. 1.

FIG. 2 illustrates an example implementation of the blueprint 126 as a multi-machine blueprint generated by the example blueprint manager 140 of FIG. 1. In the illustrated example of FIG. 2, three example basic blueprints (a web server blueprint 202, an application server blueprint 204, and a database (DB) server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum and maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service formed from one or more VMs 114 that includes web server(s) 210A, application server(s) 210B, and database server(s) 210C. The number of machines provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, 206. Accordingly, changes made to the blueprints (e.g., by a manager of the blueprints different than the manager of the multi-machine blueprint 208) may be incorporated into future provisioning of the multi-machine blueprint 208. Accordingly, an administrator maintaining the source blueprints (e.g., an administrator charged with managing the web server blueprint 202) may change or update the source blueprint and the changes may be propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint. Additionally, the blueprints may specify that the machines 210A, 210B, 210C of the multi-machine service 210 provisioned from the multi-machine blueprint 208 operate in different environments. For example, some components may be physical machines, some may be on-premise virtual machines, and some may be virtual machines at a cloud service.

Several multi-machine blueprints may be generated to provide one or more varied or customized services. For example, if virtual machines deployed in the various States of the United States require different settings, a multi-machine blueprint could be generated for each state. The multi-machine blueprints could reference the same build profile and/or disk image, but may include different settings specific to each state. For example, the deployment workflow may include an operation to set a locality setting of an operating system to identify a particular State in which a resource is physically located. Thus, a single disk image may be utilized for multiple multi-machine blueprints reducing the amount of storage space for storing disk images compared with storing a disk image for each customized setting.

Figure 3A:
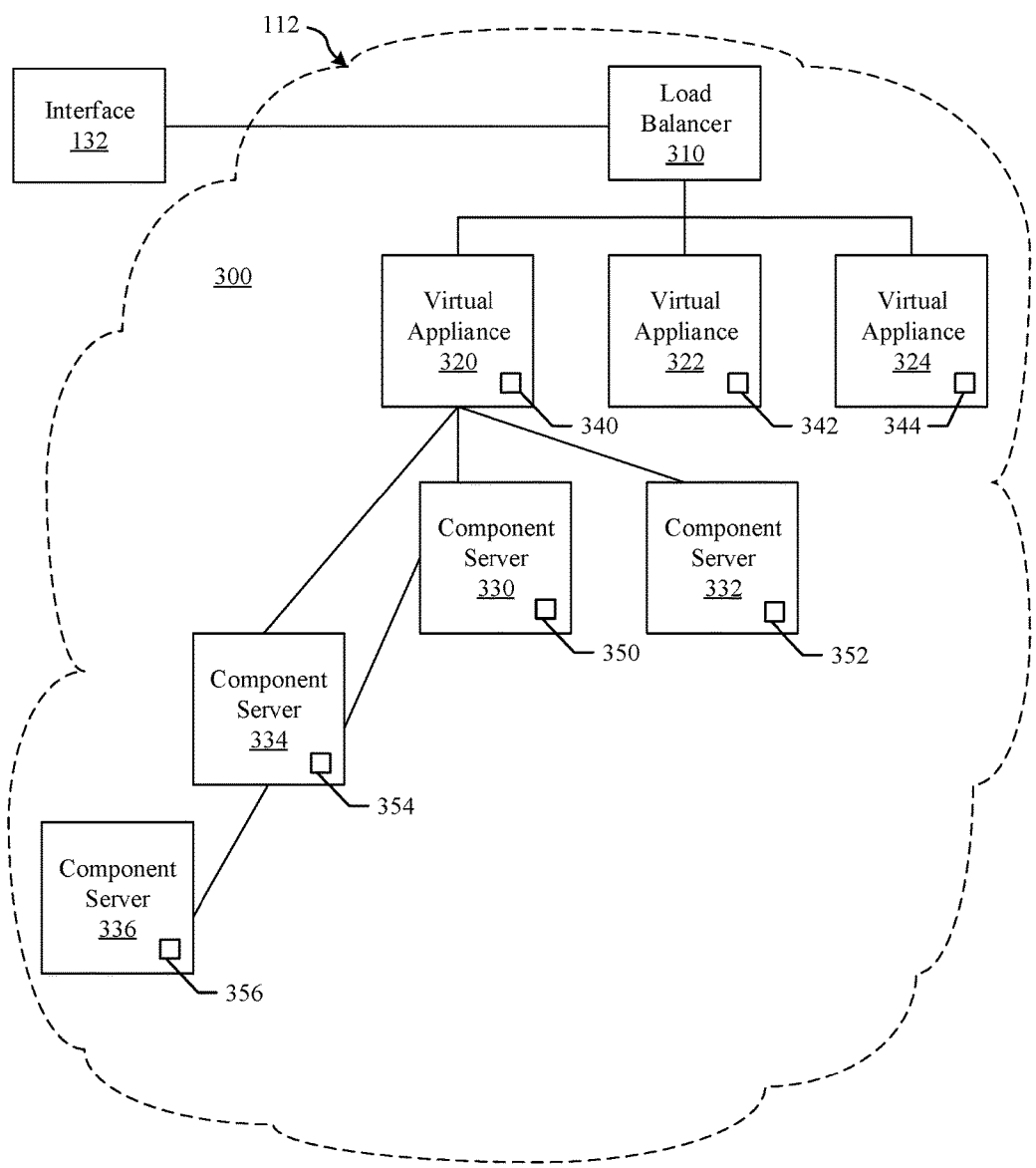
FIG. 3A illustrates an example installation of deployed virtual machines and associated servers acting as hosts for deployment of component servers for a customer.

FIG. 3A illustrates an example installation of deployed VMs 114 (also referred to as appliances or virtual appliances (vAs)) and associated servers acting as hosts for deployment of component servers (e.g., Web server, application server, database server, etc.) for a customer. The vAs can be deployed as an automation tool, for example, used to deliver VMs and associated applications for on-premise automation and/or handling of external cloud resources (e.g., Microsoft Azure™, Amazon Web Services™, etc.).

As shown in the example of FIG. 3A, an installation 300 includes a load balancer (LB) 310 to assign tasks and/or manage access among a plurality of vAs 320, 322, 324. In some examples, the example vA 320 executes the example catalog 130, the example repository 134, the example application director 106, the example cloud manager 138, etc. Each vA 320-324 is a deployed VM 114, and the vA 320 communicates with a plurality of component or host servers 330, 332, 334, 336 which store components for execution by users (e.g., Web server 210A with Web components, App server 210B with application components, DB server 210C with database components, etc.). In some examples, the example component server 330, 332, 334, 336 executes the example distributed Execution Manager(s) 146A. Additionally or alternatively, the example component server 330, 332, 334, 336 may perform any functionality that is performed by the vA 320 such as, the example catalog 130, the example repository 134, the example application director 106, the example cloud manager 138, etc. Performing functionality that would have been performed by the vA 320 at the component server 330, 332, 334, 336 enables processing loads that would otherwise be concentrated at a VM 114 hosting the vA 320 to be distributed to a different VM 114.

As shown in the example of FIG. 3A, component servers 334, 336 can stem from component server 330 rather than directly from the virtual appliance 320, although the vA 320 can still communicate with such servers 334, 336. The LB 310 enables the multiple vAs 320-324 and multiple servers 330-336 to appear as one device to a user. Access to functionality can then be distributed among appliances 320-324 by the LB 310 and among servers 330-336 by the respective appliance 320, for example. The LB 310 can use least response time, round-robin, and/or other method to balance traffic to vAs 320-324 and servers 330-336, for example.

In the example installation 300, each vA 320, 322, 324 includes a management endpoint 340, 342, 344. Each component server 330, 332, 334, 336 includes a management agent 350, 352, 354, 356. The management agents 350-356 can communicate with their respective endpoint 340 to facilitate transfer of data, execution of tasks, etc., for example.

In certain examples, a graphical user interface associated with a front end of the load balancer 310 guides a customer through one or more questions to determine system requirements for the installation 300. Once the customer has completed the questionnaire and provided firewall access to install the agents 350-356, the agents 350-356 communicate with the endpoint 340 without customer involvement. Thus, for example, if a new employee needs a Microsoft Windows® machine, a manager selects an option (e.g., clicks a button, etc.) via the graphical user interface to install a VM 114 that is managed through the installation 300. To the user, he or she is working on a single machine, but behind the scenes, the virtual appliance 320 is accessing different servers 330-336 depending upon what functionality is to be executed.

In certain examples, agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

In some examples, a management agent 350 is included in the virtual appliance 320, 322, 324 to facilitate execution of instructions at the virtual appliance 320, 322, 324. For example, the example management endpoint 340 might instruct a management agent operated at the virtual appliance 320 to execute an instruction to update the management endpoint 340. In some examples, the instructions that can be executed by a management agent operated at the virtual appliance 320 are different from the instructions that can be executed by a management agent operated at the component server 330, 332, 334, 336. For example, if the virtual appliance 320 were operated in a Linux environment and the component server 330 were operated in a Microsoft Windows® environment, the instructions supported by a management agent operated in each of those environments may be different (e.g., some of the instructions may be restricted and/or may not be available for execution on one or more of the systems).

Figure 3B:
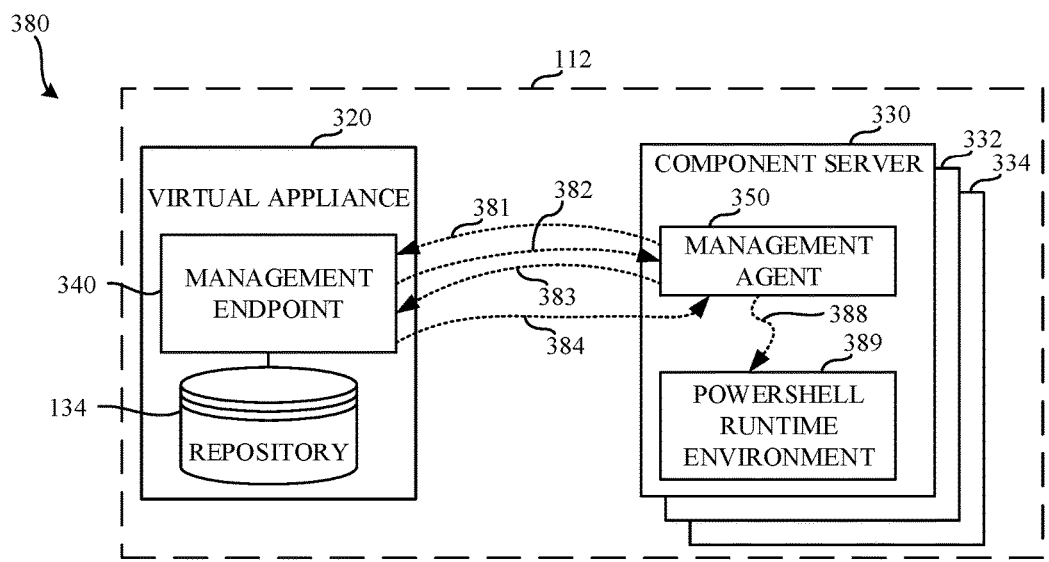
FIG. 3B is a block diagram representing an example arrangement of the virtual appliance of FIG. 3A operating the management endpoint, and the component server of FIG. 3A operating the management agent.

FIG. 3B is a block diagram representing an example arrangement 380 of the virtual appliance 320 of FIG. 3A operating the management endpoint 340, and the component server 330 of FIG. 3A operating the management agent 350. In the illustrated example of FIG. 3B, both the vA 320 and the component server 330 of FIG. 3B are operated within the same deployment environment 112. In the illustrated example of FIG. 3B, the example vA 320 includes the management endpoint 340 and the repository 134. In some examples, the repository 134 is implemented by another component of the deployment environment 112 that is separate from the vA 320. The example component server 330 includes the management agent 350 and a PowerShell™ runtime environment 389. The example PowerShell™ runtime environment 389 of the illustrated example of FIG. 3B is implemented by the Microsoft™ PowerShell™ framework. The PowerShell™ runtime environment 389 executes PowerShell™ scripts, commands, files, etc. at the direction of the management agent 350. In the illustrated example of FIG. 3B, the PowerShell™ runtime environment 389 is specific to implementations on component server(s) 330, 332, 334 that implement a Microsoft Windows™ Operating system. However, any other runtime environment and/or instruction execution system may additionally or alternatively be used. For example, the example PowerShell™ runtime environment 389 may be replaced by a script interpreter (e.g., a Perl interpreter, a Python interpreter, etc.).

While, in the illustrated example of FIG. 3B, the management agent 350 interfaces with the PowerShell™ runtime environment 389, not all instructions to be executed at the component server 330 are executed outside of the management agent 350. In some examples, the management agent 350 may execute instructions internally without interfacing with the PowerShell™ runtime environment 389 (or some other external runtime environment). In some examples, functionality of the management agent 350 can be extended using a plug-in framework. That is, functionality can dynamically be added to the management agent 350 to enable new instructions to be executed internal to the management agent 350, without requiring a new version of the management agent 350 to be deployed. For example, whereas a command issued by the management endpoint 340 to the management agent 350 requesting that the management agent 350 report the local time of the component server 330 might ordinarily cause the management agent 350 to interface with the PowerShell™ runtime environment 389 to retrieve the local system time, such functionality can be added to the management agent 350 (e.g., a function may be executed within the management agent 350 to retrieve the local system time). Thus, interfacing with the PowerShell™ runtime environment 389 might not be necessary. As a result, computational overhead involved with invoking external runtime environments (e.g., the PowerShell™ runtime environment 389) is reduced.

In the illustrated example of FIG. 3B, the example management agent 350 requests an indication of an instruction to be executed from the management endpoint 340 (line 381). The management endpoint 340 provides the indication of the instruction to be executed to the management agent 350 (line 382). In some examples, the indication of the instruction to be executed is formatted as a name of a command and parameters that are to be used when executing the command. However, the example indication of the instruction may be provided in any other format, such as, an extensible markup language (XML) document that identifies, for example, a name of the instruction to be executed (e.g., "Get_Local_Time"), a location from which the instruction is to be retrieved, one or more parameter (e.g., command line parameters) that are to be used and/or specified when executing the instruction, an expected result of the instruction, and/or any other information to facilitate execution of the instruction at the component server 330. As used herein, a command is a collection of one or more instructions that can be executed internally with respect to the management agent 350. While a command is executed internally with respect to the management agent 350, in some examples, execution of the command (and/or instructions associated with the command) may invoke execution of instructions external to the management agent 350 (e.g., may invoke execution of a PowerShell™ script, an executable file, etc.).

The management agent 350 attempts to identify whether the command is known to the management agent 350 (e.g., the command can be implemented by a package that is currently loaded by the management agent 350, or the command is implemented by a package that is stored locally and can be loaded by the management agent 350, etc.) and, if the management agent 350 determines that the command is not known to the management agent 350, the management agent 350 requests a package (line 383) from the management endpoint 340 that, when loaded by the management agent 350, enables the management agent 350 to execute the command named in the indication of the instruction to be executed. In the illustrated example of FIG. 3B, the management endpoint 340 provides the package to the management agent 350 (line 384). The management agent 350 then loads the package, and executes the command named in the indication of the instruction to be executed (which was enabled via the loading of the provided package). In some examples, the execution of the command named in the indication of the instruction causes the management agent 350 to interface with the PowerShell™ runtime environment 389 to execute other instructions (line 388) (e.g., a PowerShell™ script, an executable file, etc.). In some examples, the other instructions are provided as part of the package. In some examples, the package is implemented using an archive file (e.g., a .zip file, a .rar file, etc.) that includes components to be executed (e.g., dynamically linked library (DLL) files, plugin files, binary executables, etc.) and a description file. The description file is formatted as an extensible markup language (XML) file and identifies commands that are supported by one or more of the components to be executed, for example.

Figure 3C:
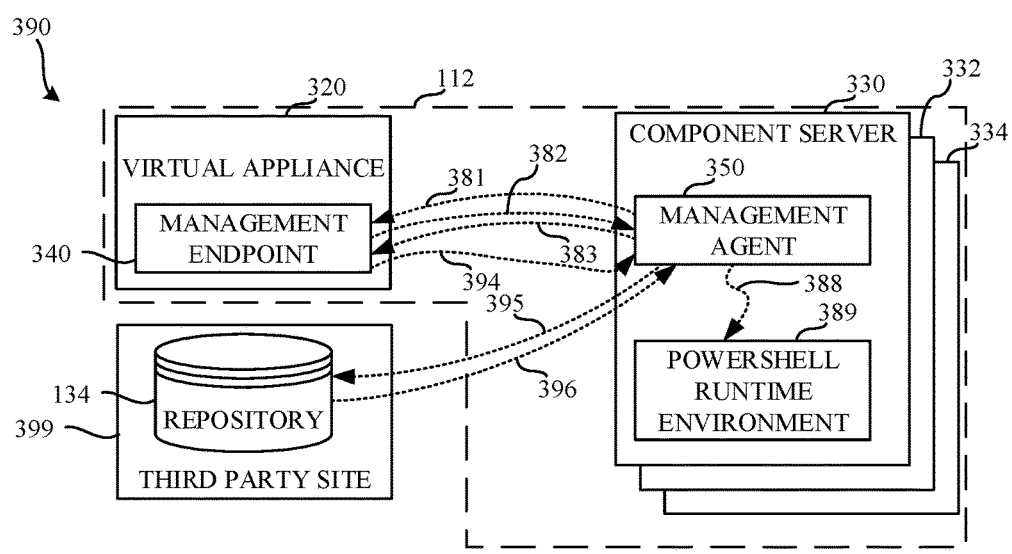
FIG. 3C is a block diagram representing an example alternative arrangement of the virtual appliance of FIG. 3A operating the management endpoint, and the component server of FIG. 3A operating the management agent.

FIG. 3C is a block diagram representing an example alternative arrangement 390 of the virtual appliance of FIG. 3A operating the management endpoint, and the component server of FIG. 3A operating the management agent. In contrast to the example arrangement 380 of FIG. 3B, the example arrangement 390 of FIG. 3C implements the example repository 134 at a third party site 399 that is outside of the deployment environment 112. In such an example, instead of the management endpoint 340 directly providing the package to the management agent 350, the management endpoint 340 may provide a link to the package and/or other information identifying where the package can be retrieved (line 394). The management agent 350 then requests the package from the repository 134 (line 395), and receives a response including the package (line 396). The management agent 350 then loads the package, and executes the command named in the indication of the instruction to be executed (which was enabled via the loading of the provided package).

In the illustrated example of FIG. 3C, the repository 134 from which the management agent 350 retrieves the package is managed and/or operated by a third party organization (e.g., a professional service organization (PSO)) that manages and/or develops instructions (e.g., develops executable code, develops workflows, develops plugins, etc.). Such an approach enables an administrator of the deployment environment to easily work with third party software providers (e.g., consultants, PSOs, plugin providers, etc.) that create instructions (e.g., executable files, plugin files, etc.) that may be customized for the deployment environment 112. In this manner, the administrator can simply direct the management endpoint 340 to cause the management agents 350 to retrieve the instructions from the repository 134 hosted at the third party site 399 by the third party organization, and execute those instructions. Such an approach alleviates storage needs within the deployment environment 112. Such an approach also facilitates more rapid development and deployment of instructions, as instructions need not first be populated into a repository within the deployment environment 112.

Figure 4:
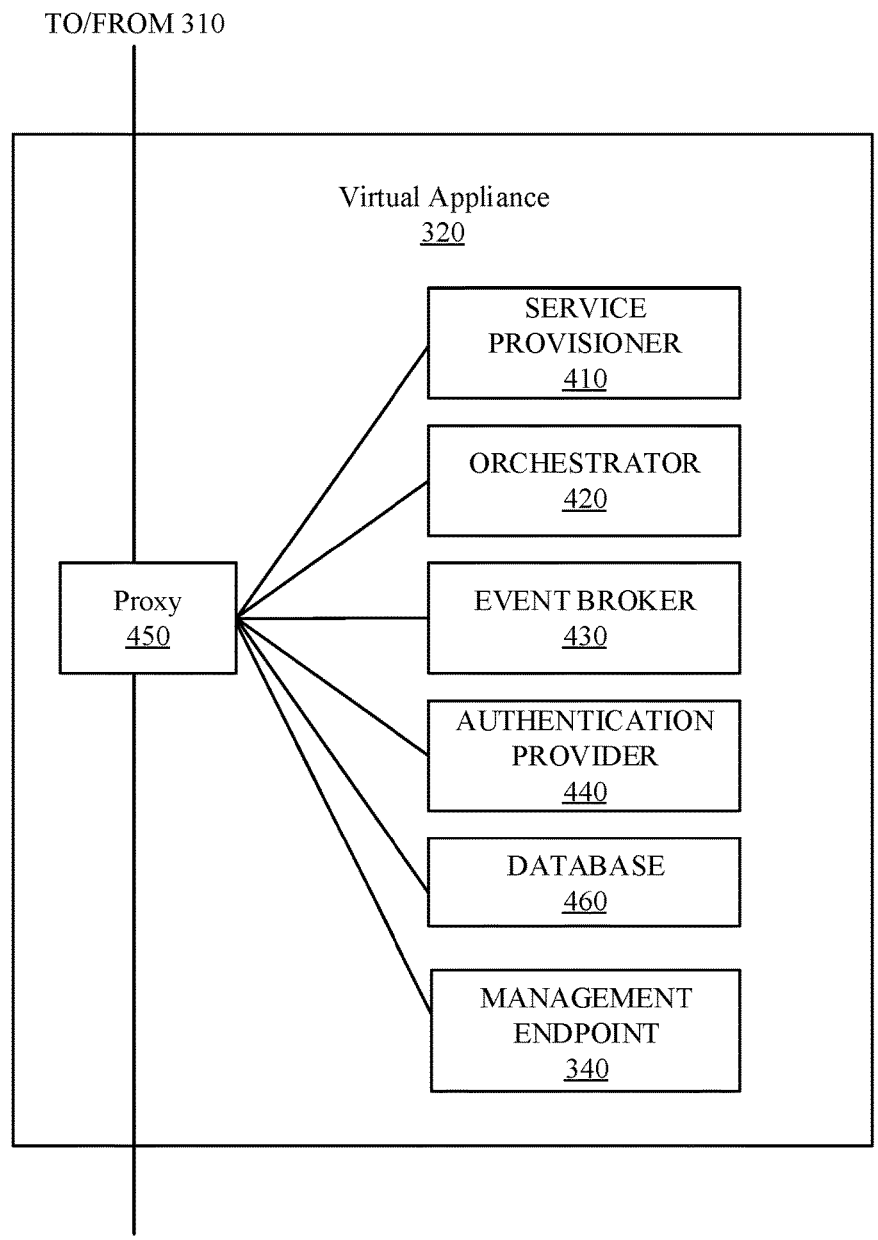
FIG. 4 illustrates an example implementation of a virtual appliance.

FIG. 4 illustrates an example implementation of the vA 320. In the example of FIG. 4, the vA 320 includes a service provisioner 410, an orchestrator 420, an event broker 430, an authentication provider 440, an internal reverse proxy 450, a database 460, and the management endpoint 340 (see FIG. 3A). The components 410, 420, 430, 440, 450, 460, 340 of the vA 320 may be implemented by one or more of the VMs 114. The example service provisioner 410 provides services to provision interfaces (e.g., Web interface, application interface, etc.) for the vA 320. The example orchestrator (e.g., vCO) 420 is an embedded or internal orchestrator that can leverage a provisioning manager, such as the application director 106 and/or cloud manager 138, to provision VM services but is embedded in the vA 320. For example, the vCO 420 can be used to invoke a blueprint to provision a manager for services. The example management endpoint 340 interfaces within management agents (e.g., management agent 350) of respective component servers (e.g., component server 330) to provide indications of instructions to be executed by the management agent(s) 350 and/or receive results and/or statuses of execution of those instructions. An example implementation of an example management agent 350 is disclosed below in connection with FIG. 6.

Example services can include catalog services, identity services, component registry services, event broker services, IaaS, repository services, etc. Catalog services provide a user interface via which a user can request provisioning of different preset environments (e.g., a VM including an operating system and software and some customization, etc.), for example. Identity services facilitate authentication and authorization of users and assigned roles, for example. The component registry maintains information installed and deployed services (e.g., uniform resource locators for services installed in a VM/vA, etc.), for example. The event broker 430 provides a messaging broker for event-based communication, for example. The IaaS provisions one or more VMs for a customer via the vA 320.

Repository services enable the vA 320 to operate a repository such as, the repository 134 of FIG. 1. In this manner, the repository 134 may be implemented within the deployment environment 112 (e.g., as a component of the vA 320) and/or external to the deployment environment 112. Implementing the repository 134 within the deployment environment 112 enables an administrator 116 of the deployment environment 112 to host instructions for execution at monitoring agents within the deployment environment. In this manner, an administrator can implement configurations that are specific to their deployment environment 112 without having to reference a third party and/or publicly available repository. In contrast, in some examples, the repository 134 may be hosted outside of the deployment environment 112 (e.g., within another deployment environment hosted by the cloud provider 110, outside of the control of the cloud provider 110, etc.) Implementing the repository 134 outside of the deployment environment 112 enables the administrator 116 to configure the management endpoint 340 to instruct one or more management endpoints 350 to retrieve and/or execute instructions hosted by a third party (e.g., a developer, a professional services organization (PSO), a publicly available website, etc.). Such an approach is useful when a third party provides instructions (e.g., executables) that may be updated by the third party.

The example event broker 430 provides a mechanism to handle tasks which are transferred between services with the orchestrator 420. The example authentication provider 440 (e.g., VMware Horizon™ services, etc.) authenticates access to services and data, for example.

The components of the vA 320 access each other through REST API calls behind the internal reverse proxy 450 (e.g., a high availability (HA) proxy HAProxy) which provides a high availability load balancer and proxy for Transmission Control Protocol (TCP)- and Hypertext Transfer Protocol (HTTP)-based application requests. The proxy 450 forwards communication traffic from within the vA 320 and/or between vAs 320, 322, 324 of FIG. 3A to the appropriate component(s) of the vA 320. In certain examples, services access the local host/proxy 450 on a particular port, and the call is masked by the proxy 450 and forwarded to the particular component of the vA 320. Since the call is masked by the proxy 450, components can be adjusted within the vA 320 without impacting outside users.

Figure 5:
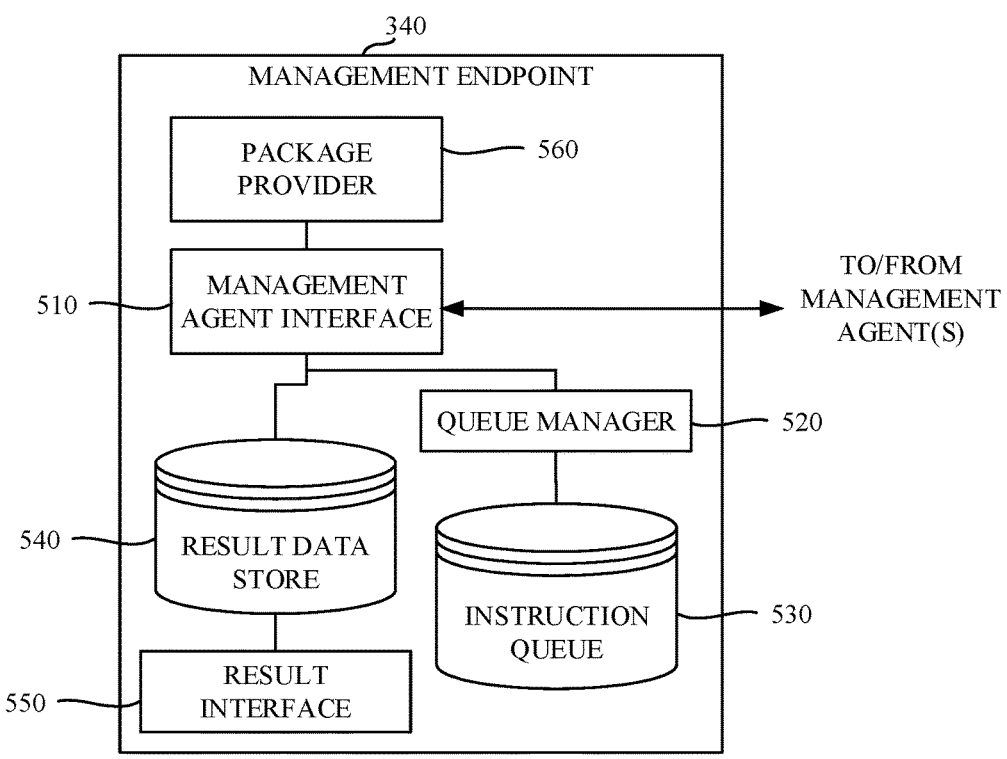
FIG. 5 is a block diagram representing an example implementation of the example management endpoint of the example VA of FIGS. 3A, 3B, 3C and/or 4.

FIG. 5 is a block diagram representing an example implementation of the example management endpoint 340 of the example VA 320 of FIGS. 3A, 3B, 3C and/or 4. The example management endpoint 340 of FIG. 5 includes a management agent interface 510, a queue manager 520, an instruction queue 530, a result data store 540, a result interface 550, and a package provider 560.

The example management agent interface 510 of the illustrated example of FIG. 5 implements a REST (Representational State Transfer) API (Application Programming Interface) that is responsive to requests from the management agent 350 for indications of instructions in the instruction queue 530. In some examples, the example management agent interface 510 handles incoming requests from management agent(s), and identifies an instruction stored in the instruction queue 530 to be executed by the management agent from which the request was received. The example management agent interface 510 responds to the request with an indication of the instruction to be executed. In some examples, the indication of the instruction to be executed is formatted as a name of a command and parameters to be used when executing the command. That is, the indication of the instruction may not include the instructions to be executed itself, but rather, might identify to the management agent 350 the instructions that are to be executed.

As noted above, the example management agent interface 510 implements a REST API. However, any other approach to implementing the example management agent interface 510 may additionally or alternatively be used. In some examples, the management agent 350 periodically and/or aperiodically polls and/or otherwise requests instructions from the management agent interface 510. The example management agent interface 510 responds to such requests with an indication of an instruction (if any) to be executed by the example management agent 350. However, any other approach to informing the example management agent 350 may additionally or alternatively be used. For example, the example management agent interface 510 may provide an interface for the management agent 350 to subscribe to indications of instructions from the management endpoint 340 such that the management agent interface 510 contacts the management agent 350 to inform the management agent 350 of the instruction for execution. Such an approach may be implemented using a REST subscription interface. However, any other type of subscription interface may additionally or alternatively be used.

The example queue manager 520 of the illustrated example of FIG. 5 manages a queue of instructions to be executed by the example management agent 350. In some examples, instructions are added to the queue at the request of an administrator. However, instructions may be added to the queue in response to any other event such as, a scheduled task, an error identified by a management agent, etc. In some examples, multiple different queues are managed corresponding to multiple different management agents that work in communication with the management endpoint 340. Upon receipt of an indication of whether an instruction in the queue has been executed at a component server, the example queue manager 520 removes the instruction from the instruction queue 530 associated with that component server. However, in some examples, the instruction may remain in the queue, but be labeled with a status of the execution of the instruction. In this manner, when a request is received for an instruction to be executed, a result of such query might be limited to only those instructions where execution has not already been attempted.

The example instruction queue 530 of the illustrated example of FIG. 5 stores indications of instructions to be executed at a component servers 330 (at the direction of the management agent 350 of each component server 330). In some examples, additional parameters concerning the indication of the instructions are also stored in the instruction queue 530 such as, a name of the command and/or instruction to be executed, a location from which the command and/or instruction is to be retrieved (e.g., where a package that supports execution of the command and/or instruction can be found), one or more parameters (e.g., command line parameters) that are to be used and/or specified when executing the command and/or instruction, an expected result, an indication of one or more commands and/or instructions to be executed and/or actions to be performed when a result of the execution of the command and/or instruction does not match the expected result, and/or any other information to facilitate execution of the command and/or instruction at the component server 330. In some examples, the example instruction queue 530 may be any device for storing data such as, flash memory, magnetic media, optical media, etc. Furthermore, the data stored in the example instruction queue 530 may be in any data format such as, binary data, comma delimited data, tab delimited data, structured query language (SQL) structures, etc. While, in the illustrated example, the example instruction queue 530 is illustrated as a single database, the example instruction queue 530 may be implemented by any number and/or type(s) of databases.

The example result data store 540 of the illustrated example of FIG. 5 stores results of the execution of instructions by the management agents 350. In some examples, the example result data store 540 may be any device for storing data such as, flash memory, magnetic media, optical media, etc. Furthermore, the data stored in the example result data store 540 may be in any data format such as, binary data, comma delimited data, tab delimited data, structured query language (SQL) structures, etc. While, in the illustrated example, the example result data store 540 is illustrated as a single database, the example result data store 540 may be implemented by any number and/or type(s) of databases.

The example result interface 550 of the illustrated example of FIG. 5 enables an administrator to review the results of the instruction execution(s) stored in the example result data stored 540. In some examples, the example result interface 550 is implemented as a webpage. However, any other approach to implementing the result interface 550 may additionally or alternatively be used.

The example package provider 560 of the illustrated example of FIG. 5 responds to a request for a package received via the management agent interface 510. In the illustrated example of FIG. 5, the request for a package indicates a command that was identified to a management agent 350 for execution. The example package provider 560 searches the repository 134 for a package that implements the identified command, and provides the identified package, a link to the package to the management agent 350, or an error message indicating that the package could not be found, for example.

Figure 6:
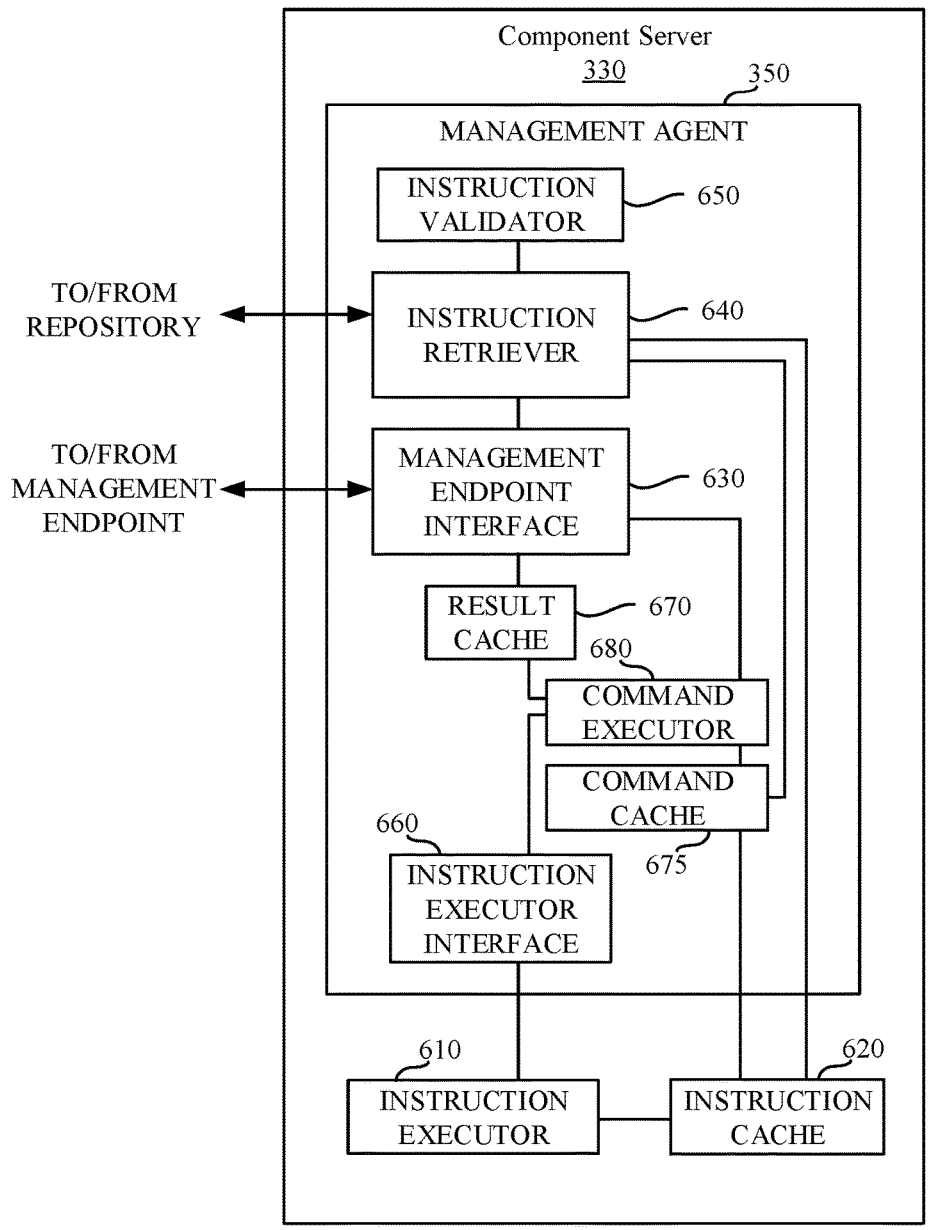
FIG. 6 is a block diagram representing an example implementation of the example component server of the illustrated example of FIG. 3A.

FIG. 6 is a block diagram representing an example implementation of the example component server 330 of the illustrated example of FIG. 3A. The example component server 330 includes the management agent 350, an instruction executor 610, and an instruction cache 620. The example management agent 350 includes a management endpoint interface 630, an instruction retriever 640, an instruction validator 650, an instruction executor interface 660, a result cache 670, a command cache 675, and a command executor 680.

The example instruction executor 610 of the illustrated example of FIG. 6 executes instructions stored in the instruction cache 620 at the request of the instruction executor interface 660. The example instruction executor 610 is implemented by a command execution framework such as, for example the Microsoft™ PowerShell™ framework. However, any other type of command execution framework such as, a scripting interpreter framework (e.g., Perl, Python, etc.), an executable framework, an operating system kernel, etc., may additionally or alternatively be used.

In some examples, the example instruction executor 610 is separate from the management agent 350. Since the instruction executor 610 is separate from the management agent 350, the instruction executor 610 can execute instructions that affect the operation of the management agent 350. For example, the instruction executor 610 may execute an instruction that causes the management agent 350 to become updated and/or upgraded. Such an upgrade and/or installation of the management agent 350 may involve uninstalling the management agent 350 having a first version and subsequently installing the management agent 350 having a second version. In some examples, the management agent 350 might alternatively be downgraded to address, for example, an issue encountered subsequent to a prior upgrade and/or installation. Enabling the management agent 350 to be updated and/or upgraded by the instruction executor 610 is beneficial because, through the use of distributed execution of such installations, upgrades can be completed in a more timely fashion as compared to manual installation of an upgrade. In this manner, hundreds or thousands of management agents can rapidly be upgraded, rebooted, restarted, etc.

The example instruction cache 620 of the illustrated example of FIG. 6 is a local storage of the component server 330. In some examples, the example instruction cache 620 is a directory within a file system hosted by the example component server 330. However, in some examples, the example instruction cache 620 may be implemented by any type of file storage system. In some examples, the example instruction cache 620 may be remote from the component server 330.

The example management endpoint interface 630 of the illustrated example of FIG. 6 transmits a request to the management endpoint 340 for an indication of an instruction to be executed at the component server 330. In some examples, the request is formatted using a representational state transfer (REST) protocol. However, any other past, present, and/or future protocol and/or approach for requesting an indication of an instruction to be executed may additionally or alternatively be used. In some examples, the example management endpoint 340 responds to the request with an indication of the instruction to be executed. The example indication of the instruction to be executed is formatted as a command to be executed by the command executor 680. However, any other type and/or format for the indication of the instruction to be executed may additionally or alternatively be used.

In some examples, the management endpoint interface 630 periodically polls and/or otherwise requests instructions from the management endpoint 340. However, any other periodic and/or aperiodic approach to requesting an indication of an instruction from the management endpoint 340 may additionally or alternatively be used such as, polling the management endpoint 340 when resources of the component server 330 are idle, polling the management endpoint 340 in response to completion of execution of a prior instruction, etc. In some examples, the example management endpoint interface 630 may subscribe to indications of instructions from the management endpoint 340 such that the management endpoint 340 contacts the management endpoint interface 630 via the subscription connection to inform the management agent 350 of the instruction for execution. Such an approach may be implemented using a REST subscription interface. However, any other type of subscription interface may additionally or alternatively be used.

The example instruction retriever 640 of the illustrated example of FIG. 6 determines whether command and/or instructions identified in the indication received from the management endpoint 340 are loaded in the command cache 675 and/or are stored in the instruction cache 620 and, if not, attempts to retrieve the instructions from the management endpoint. In some examples, the example instruction retriever 640 inspects plugins loaded in the command cache 675 for a plugin that can operate the command. In some examples, the example instruction retriever 640 inspects package files stored in the instruction cache 620 by, for example, inspecting a description file identifying the commands supported by each corresponding package file. In some examples, the example instruction retriever 640 retrieves the package from the repository 134 at the direction of the management endpoint 340. That is, in some examples, when providing the indication of the instruction to be executed, the management endpoint 340 identifies the repository and/or another location where the package may be retrieved. In some examples, the indication of the instruction to be executed also identifies a version of the instruction and/or package (e.g., version 1.2) to be executed and/or loaded into the command cache 675. In such an example, in addition to determining that the instruction and/or package is present in the instruction cache 620, the example instruction retriever 640 verifies whether a specified version of the instruction and/or package is either loaded in the command cache 675 and/or is present in the instruction cache 620. If the specified version is not loaded and/or present, the specified version of the instruction and/or package is either loaded into the command cache 675 or is retrieved from the repository 134 and loaded into the command cache 675.

The example instruction executor interface 660 of the illustrated example of FIG. 6 interacts with the instruction executor 610 to cause the instruction executor 610 to execute the instructions stored in the instruction cache 620 (e.g., the file system of the component server 330). In some examples, the instructions may be stored in the instruction cache 620 as a result of requesting the package from the management agent 340. In some examples, the example instruction executor interface 660 provides input parameters to the instruction executor 610 specified in the indication of the instruction to be executed provided by the management endpoint 340.

As noted above, the example instruction executor 610 is separate from the management agent 350 and/or the example instruction executor interface 660. The example instruction executor 610 executes the instructions in a separate execution space from the instruction executor interface 660 and, more generally, the management agent 350. As a result, at the direction of the instruction executor interface 660, the instruction executor 610 can execute instructions that affect the operation of the management agent 350.

The example instruction executor interface 660 of the illustrated example of FIG. 6 monitors an output of the instruction executor 610. In some examples, the example instruction executor interface 660 monitors a standard output (e.g., a command line output) of the instruction executor 610. However, any other approach to monitoring an output of the example instruction executor 610 may additionally or alternatively be used such as, a standard error interface, an event log, an output file, etc. The example instruction executor interface 660 passes the result of the execution of the instruction to the example command executor 680, which may store the result in the example result cache 670.

While enabling the management agent 350 to interact with an external instruction executor 610 allows a wide range of instructions to be executed, not all instructions are executed outside of the management agent 350. In some examples, it is more computationally efficient to execute commands internal to the management agent. For example, instructions may be loaded into the command cache 675 for execution by the command executor 680. By loading instructions into the command cache 675, the command cache 675 and/or the command executor 680 can implement a plugin framework. As used herein, a plugin (sometimes referred to as a plug-in, an add-in, an add-on, an extension, etc.) is a software component that adds a specific feature to an existing system. The plugin framework enables third party developers (e.g., PSOs) to develop extensions and/or additional functionality to be implemented within the management agent 350. Utilizing a plugin framework also enables a reduction in the memory resources utilized by the management agent 350, as components of the management agent 350 are loaded into memory on demand (e.g., as they are to be used), instead of every possible component being loaded into memory upon initialization of the management agent 350.

The example command cache 675 of the illustrated example of FIG. 6 is implemented by a memory space utilized by the management agent 350. In some examples, a portion of a package (e.g., one or more dynamically linked libraries (DLLs)) is loaded into the command cache 675 from the instruction cache 620 such that commands and/or functions provided by the portion of the package can be executed by the command executor 680. In some examples, the example instruction retriever 640 inspects the command cache 675 to determine whether a command identified for execution by the management agent 350 is loaded.

The example command executor 680 executes commands and/or instructions loaded in the command cache 675 at the direction of the management endpoint interface 630. In some examples, execution of the commands and/or instructions loaded in the command cache 675 involves communicating with the instruction executor interface 660 to interface with the instruction executor 610. That is, in some examples, the commands and/or instructions loaded in the command cache 675 may invoke some instructions to be executed by an execution framework outside of the management agent 350. In the illustrated example of FIG. 6, the example command executor 680 stores results of the execution of the commands and/or instructions loaded in the command cache 675 and/or the instructions executed by the instruction executor 610 in the result cache 670.

The example result cache 670 of the illustrated example of FIG. 6 stores execution results collected by the command executor and/or instruction executor interface 660. Results stored in the example result cache 670 may be cleared (e.g., deleted and/or otherwise removed) from the result cache 670 when the example management endpoint interface 630 transmits the results stored in the result cache 670 to the management endpoint 340. In some examples, the example result cache 670 may be any device for storing data such as, flash memory, magnetic media, optical media, etc. Furthermore, the data stored in the example result cache 670 may be in any data format such as, binary data, comma delimited data, tab delimited data, structured query language (SQL) structures, etc. While, in the illustrated example, the example result cache 670 is illustrated as a single database, the example result cache 670 may be implemented by any number and/or type(s) of databases.

While an example manner of implementing the example management endpoint 340 of FIGS. 3A, 3B, 3C and/or 4 is illustrated in FIG. 5, and an example manner of implementing the example management agent 350 of FIG. 3A is illustrated in FIG. 6, one or more of the elements, processes and/or devices illustrated in FIGS. 3A, 3B, 3C, 4, 5, and/or 6 may be combined, divided, re-arranged, omitted, eliminated and/or implemented in any other way. Further, the example management agent interface 510, the example queue manager 520, the example instruction queue 530, the example result data store 540, the example result interface 550, the example package provider 560, and/or, more generally, the example management endpoint 340 of FIGS. 3A, 3B, 3C, 4, and/or 5, and/or the example management endpoint interface 630, the example instruction retriever 640, the example instruction validator 650, the example instruction executor interface 660, the example result cache 670, the example command cache 675, the example command executor 680, and/or, more generally, the example management agent 350 of FIGS. 3A, 3B, 3C and/or 6 may be implemented by hardware, software, firmware and/or any combination of hardware, software and/or firmware. Thus, for example, any of the example management agent interface 510, the example queue manager 520, the example instruction queue 530, the example result data store 540, the example result interface 550, the example package provider 560, and/or, more generally, the example management endpoint 340 of FIGS. 3A, 3B, 3C, 4, and/or 5, and/or the example management endpoint interface 630, the example instruction retriever 640, the example instruction validator 650, the example instruction executor interface 660, the example result cache 670, the example command cache 675, the example command executor 680, and/or, more generally, the example management agent 350 of FIGS. 3A, 3B, 3C and/or 6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example management agent interface 510, the example queue manager 520, the example instruction queue 530, the example result data store 540, the example result interface 550, the example package provider 560, and/or, more generally, the example management endpoint 340 of FIGS. 3A, 3B, 3C, 4, and/or 5, and/or the example management endpoint interface 630, the example instruction retriever 640, the example instruction validator 650, the example instruction executor interface 660, the example result cache 670, the example command cache 675, the example command executor 680, and/or, more generally, the example management agent 350 of FIGS. 3A, 3B, 3C and/or 6 is/are hereby expressly defined to include a tangible computer readable storage device or storage disk such as a memory, a digital versatile disk (DVD), a compact disk (CD), a Blu-ray disk, etc. storing the software and/or firmware. Further still, the example management endpoint 340 of FIGS. 3A, 3B, 3C, 4, and/or 5, and/or the example management agent 350 of FIGS. 3A, 3B, 3C, and/or 6 may include one or more elements, processes and/or devices in addition to, or instead of, those illustrated in FIGS. 3A, 3B, 3C, 4, 5, and/or 6, and/or may include more than one of any or all of the illustrated elements, processes and devices.

Figure 7:
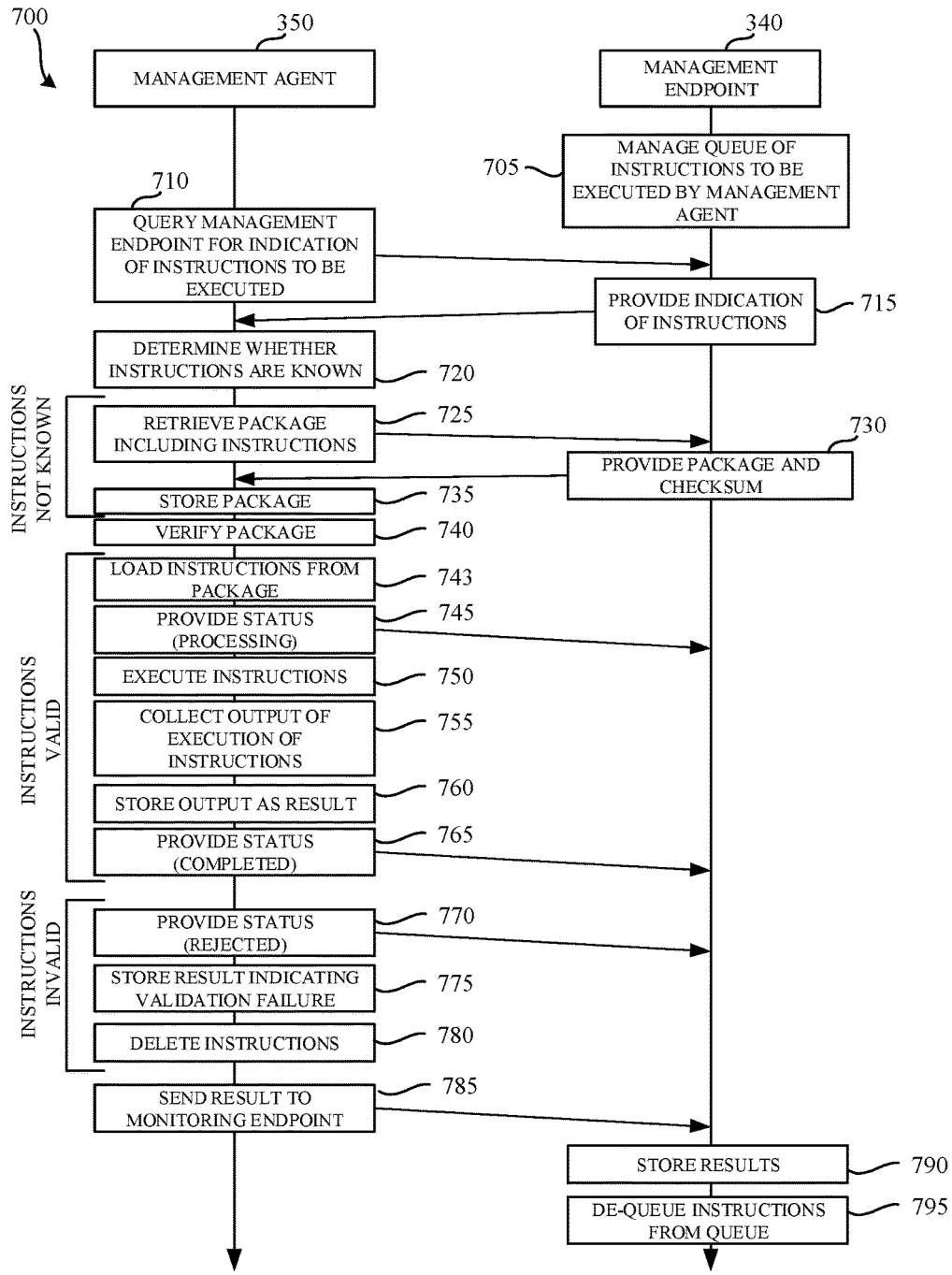
FIG. 7 is a sequence diagram 700 representative of operations performed by the example management agent of FIGS. 3A, 3B, 3C and/or 6, and/or the example management endpoint of FIGS. 3A, 3B, 3C, 4, and/or 5.
Figure 8:
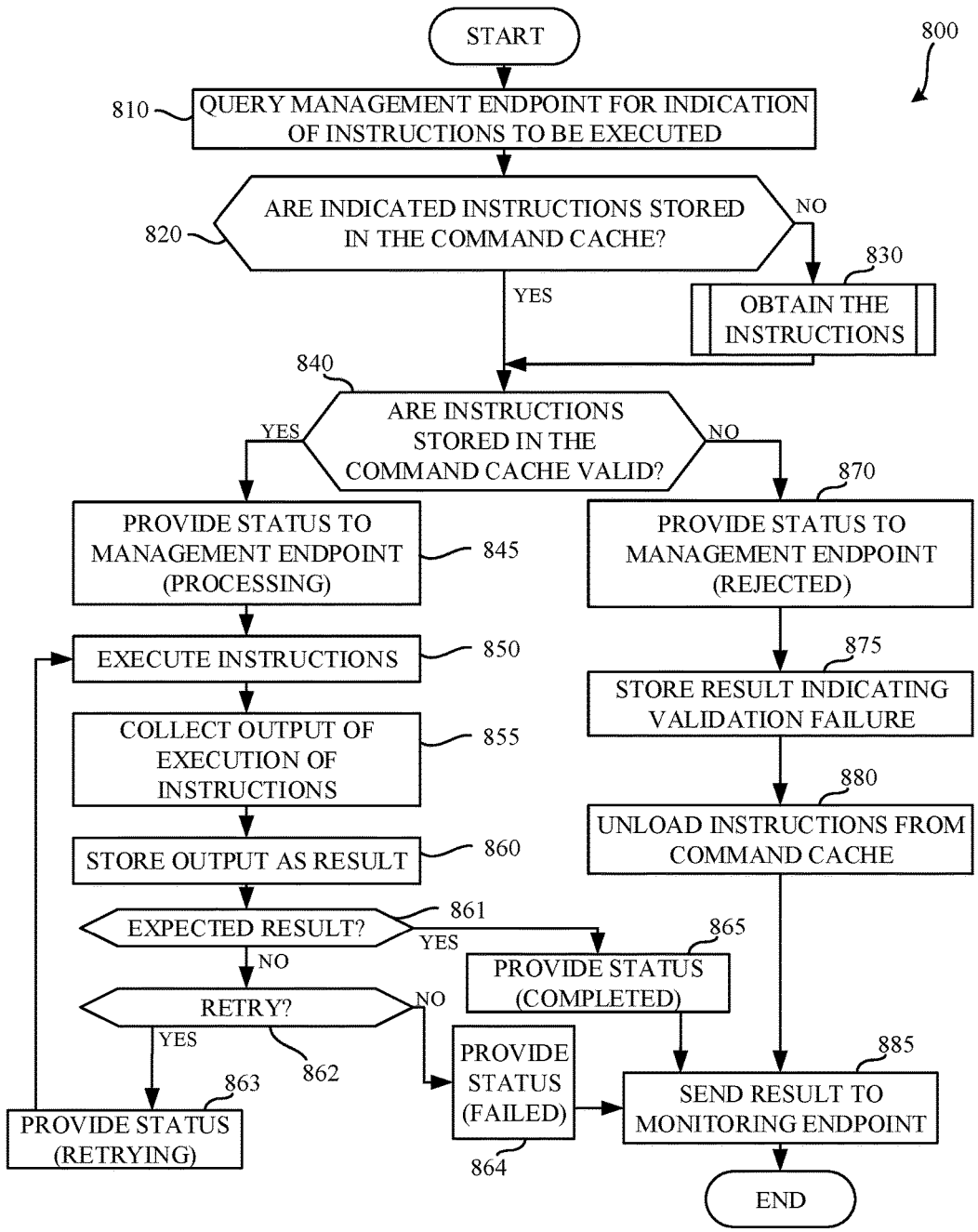
FIG. 8 is a flowchart representative of example machine-readable instructions that may be executed to implement the example management agent of FIGS. 3A, 3B, 3C and/or 6.
Figure 9:
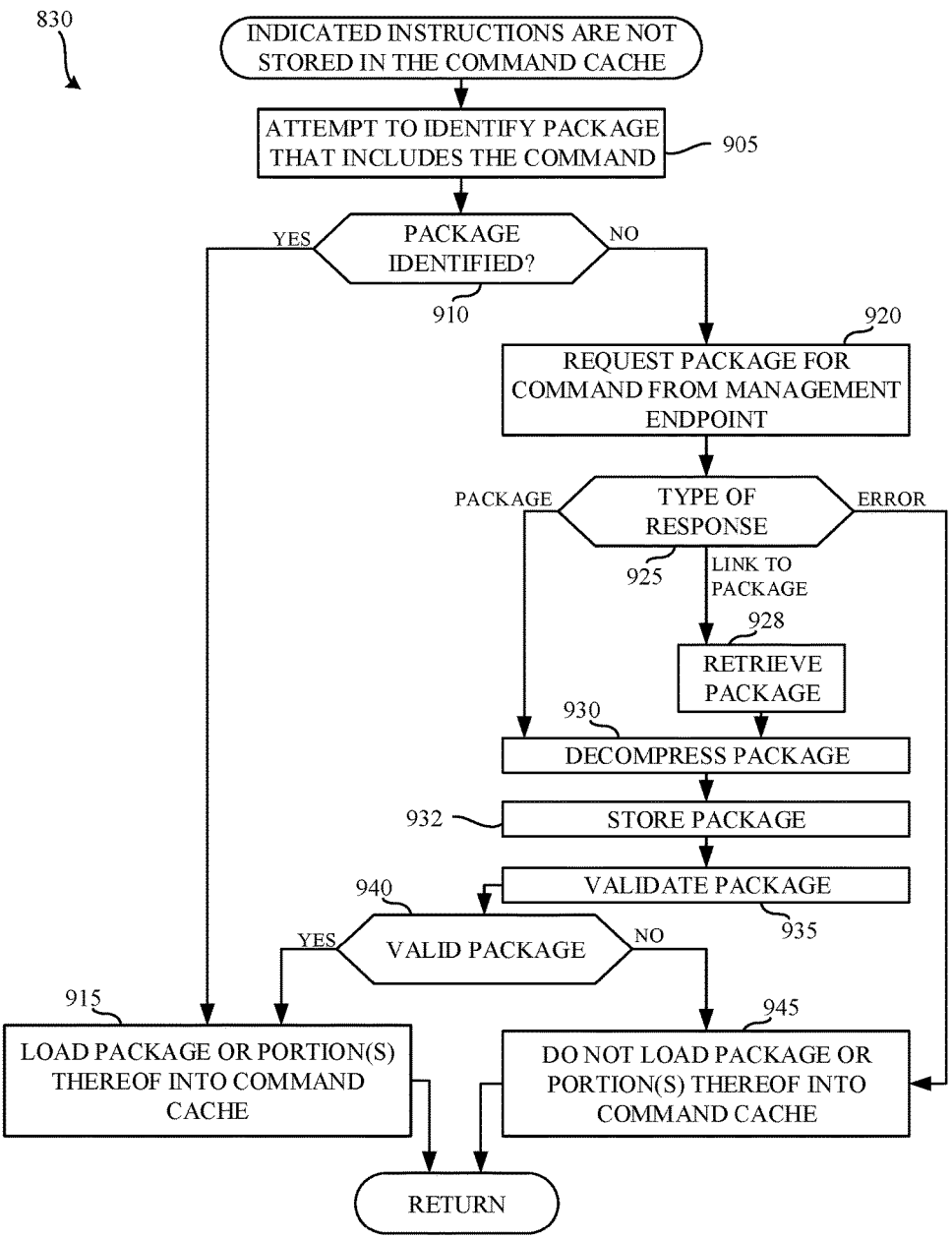
FIG. 9 is a flowchart representative of example machine-readable instructions that may be executed to implement the example management agent of FIGS. 3A, 3B, 3C and/or 6.

Flowcharts representative of example machine readable instructions that may be executed to implement the example management endpoint 340 of FIGS. 3A, 3B, 3C, 4, and/or 5 and/or the example management agent 350 of FIGS. 3A, 3B, 3C, and/or 6 are shown in FIGS. 7, 8, 9, and/or 10. In these examples, the machine readable instructions implement programs for execution by a processor such as the processor 1112, 1212 shown in the example processor platform 1100, 1200 discussed below in connection with FIGS. 11 and/or 12. The programs may be embodied in software stored on a tangible computer readable storage medium such as a CD-ROM, a floppy disk, a hard drive, a digital versatile disk (DVD), a Blu-ray disk, or a memory associated with the processor 1112, 1212, but the entire program and/or parts thereof could alternatively be executed by a device other than the processor 1112, 1212 and/or embodied in firmware or dedicated hardware. Further, although the example programs are described with reference to the flowcharts illustrated in FIGS. 7, 8, 9, and/or 10, many other methods of deploying, managing, and updating workload domains in accordance with the teachings of this disclosure may alternatively be used. For example, the order of execution of the blocks may be changed, and/or some of the blocks described may be changed, eliminated, or combined.

As mentioned above, the example processes of FIGS. 7, 8, 9, and/or 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 7, 8, 9, and/or 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 7 is a sequence diagram 700 representative of operations performed by the example management agent 350 of FIGS. 3A, 3B, 3C and/or 6, and/or the example management endpoint 340 of FIGS. 3A, 3B, 3C, 4, and/or 5. The example sequence 700 of FIG. 7 begins with the example queue manager 520 of the example management endpoint 340 managing a queue of instructions to be executed by the management agent 350 (block 705). In some examples, the example queue manager 520 utilizes a first-in-first-out approach to scheduling execution of instructions at the management agent(s) 350. That is, instructions are queued for execution at the management agent(s) in the order in which they are identified for execution (e.g., by an administrator). However, any other approach to scheduling may additionally or alternatively be used such as, a first-in-last-out approach. When the example management agent 350 identifies that execution of an instruction has completed (e.g., a successful execution, a failure, etc.) the example queue manager 520 removes such instructions from the queue of instructions to be executed.

The example management agent 350 queries the management endpoint 340 for an indication of instructions to be executed by the management agent 350 (block 710). The example management endpoint 340 identifies an instruction to be executed by the management agent and responds to the request received from the management agent 350 with an indication of the instruction to be executed (block 715). In some examples, the indication of the instruction includes a name of the command to be executed (e.g., "Get_Local_Time") and one or more parameters that are to be used and/or specified when executing the command.

In some other examples, the example management endpoint 340 may determine that no instructions are to be executed, and a response indicative of the same may be sent to the example management endpoint interface 530. In such an example, the example sequence of FIG. 7 may be terminated, and the management agent 350 may subsequently periodically and/or aperiodically solicit an indication of an instruction to be executed from the management endpoint 340.

Upon receipt of an indication of an instruction to be executed, the example management agent 350 determines whether the command and/or instruction to be executed is known (block 720). In some examples, the example management agent 350 inspects the example command cache 675 and/or the example instruction cache 620 of the component server 330 to determine whether the command and/or instruction is known (e.g., is a package that supports the command loaded in the example command cache 675, is a package that supports the command stored in the instruction cache 620, etc.). In the illustrated example of FIG. 7, the example management agent 350 contacts the management endpoint 340 to retrieve the package (block 725). In some examples, the example management agent 350 may contact the repository 134 to retrieve the package. In the illustrated example of FIG. 7, the management endpoint 340 directly provides the package to the management agent 350. Additionally or alternatively, the management endpoint 340 may provide a link to the package (e.g., a link to the repository 134) and direct the management agent 350 to retrieve the package from the provided link.

If the example management agent 350 determines that the command and/or instruction is not loaded in the command cache 675 or stored in the instruction cache 620, the example management agent 350 transmits a request to the management endpoint 340 to retrieve a package that implements the command and/or instruction (block 725). In some examples, the example management agent 350 may first consult with the management endpoint 340 to first identify a location of the repository 134 and/or an identification of a package that implements the command and/or instruction. The example management endpoint 340 provides the package and a checksum (e.g., an MD5 hash) to facilitate verification of the package. In some examples, the checksum may be provided to the management agent 350 as part of the indication of the instruction(s) (e.g., provided in block 715). The checksum enables the management agent 350 to verify that the proper package was retrieved from the management endpoint 340 and/or the repository 134. The example management agent 350 stores the package in the instruction cache 620 (block 735).

The example management agent 350 determines whether the retrieved package is valid (block 740). The example management agent 350 may determine whether the retrieved package is valid by, for example, computing a checksum of the retrieved package stored in the instruction cache 620 and comparing the computed checksum against the checksum provided by the repository 134 (and/or the management endpoint 340). However, any other approach to validating a retrieved package may additionally or alternatively be used. For example, validating the package may involve verifying that any pre-requisites of the package have already been installed and/or are otherwise available for execution of the instructions included in the package, performing a virus scan on the package, etc.

If the example management agent 350 determines that the retrieved package is valid, the example command executor 680 loads instructions from the package into the command cache 675 (block 743). The example management endpoint interface 630 provides a status update to the management endpoint 340 indicating that the management agent 350 is processing the command (block 745). The example command executor 680 executes the command and/or instructions loaded in the command cache 675 (block 750). The example command executor 680 collects the output of the execution of the command and/or instructions (block 755) and stores the output of the execution as a result (block 760). The example command executor 680 collects the output of the execution of the command and/or instructions by, for example, monitoring a standard out interface, monitoring a standard error interface, monitoring an event log, monitoring an output file, monitoring a returned value of a function, etc. Such monitoring of the output of the execution of the command and/or instruction is performed until execution of the command and/or instruction is complete (e.g., until the command and/or instruction completes its normal operation, until the command and/or instruction execution is terminated, until a timeout is reached, etc.) When the execution of the command and/or instruction is complete, the example management agent 350 provides a status of the execution to the management endpoint 340 indicating that execution has completed (block 765).

If the example management agent 350 determines that the retrieved package is not valid, the example management agent 350 provides a status update to the management endpoint 340 indicating that the package was rejected (block 770). The example management agent 350 stores a result indicating that the validation failed (block 775). In some examples, the result indicates a reason for the failed validation (e.g., a checksum failure, a missing pre-requisite, a virus scan, etc.). In some examples, the example management agent 350 deletes the package from the instruction cache 620 (block 780). Deleting and/or otherwise removing the package from the instruction cache 620 ensures that packages that failed validation (e.g., a package where a computed checksum did not match a checksum provided by the repository, a package that failed a virus scan, etc.) are not left on the component server 330.

The collected results are sent to the monitoring endpoint 340 by the management agent 350 (block 785). The example management endpoint 340 stores the received results in the result data store 540 (block 790). In this manner, results of the execution of the command(s) and/or instruction(s) across multiple management agents are centralized to a single management endpoint 340 such that the management endpoint can report upon the status of the execution of the instruction(s) across the multiple management agents using a single interface. The example queue manager 520 of the example management endpoint 340 de-queues the command and/or instruction identified to the management agent (see block 715) such that the command and/or instruction is not provided to the management agent 350 in response to subsequent requests (block 795). The example sequence 700 of FIG. 7 is then repeated periodically and/or aperiodically to solicit an indication of an instruction to be executed from the management endpoint 340.

FIG. 8 is a flowchart representative of example machine-readable instructions that may be executed to implement the example management agent 350 of FIGS. 3A, 3B, 3C, and/or 6. The example process 800 of FIG. 8 begins at block 810 when the example management endpoint interface 630 queries the management endpoint 340 for an indication of instructions to be executed by the management agent 350 (block 810). As noted in connection with FIG. 7, the example management endpoint 340 determines whether an instruction is to be executed and, if so, responds to the request received from the management endpoint interface 630 with an indication of the instruction to be executed. In some examples, the example management endpoint 340 may determine that no instructions are to be executed, and a response indicative of the same may be sent to the example management endpoint interface 630. In such an example, the example process of FIG. 8 may be repeated periodically and/or aperiodically to solicit in an indication of an instruction to be executed from the management endpoint. Upon receipt of an indication of an instruction to be executed, the example instruction retriever 640 determines whether the instruction to be executed is loaded in the command cache 675 620 (block 820). As noted above, the instruction is implemented as a plugin that is loaded into the command cache 675 for execution. Such instructions may be implemented by, for example, a DLL.

If the example instruction retriever 540 determines that the instruction is not loaded in the command cache 675 (e.g., block 820 returns a result of NO), the example instruction retriever 540 attempts to obtain the instructions and load those instructions into the command cache 675 (block 830). An example approach to obtaining the instructions is described below in connection with FIG. 9.

The example instruction validator 650 determines whether the instructions stored in the command cache 675 are valid (block 840). The example instruction validator 650 may determine whether the instructions are valid by, for example, confirming that the instructions can be properly called by the command executor 680. However, any other approach to validating instructions loaded in the command cache 675 may additionally or alternatively be used. For example, validating the instructions may involve verifying that any pre-requisites of the instructions have already been installed and/or are otherwise available for execution of the instructions, performing a virus scan on the instructions, etc.

If the example instruction validator 650 determines that the instructions are valid (e.g., block 840 returns a result of YES), the example management endpoint interface 630 provides a status update to the management endpoint 340 indicating that the management agent 350 is processing the instruction (block 845). The example command executor 680 executes the instructions loaded in the command cache 675 (block 850). In some examples, execution of the instructions loaded in the command cache 675 may invoke the instruction executor interface 660 to instruct the instruction executor 610 to execute an instruction.

The example command executor 680 collects a result of the execution of the instructions (block 855) and stores the output of the execution of the instructions in the result cache 670 as a result of the execution of the instruction (block 860). Such monitoring of the output of the execution of the instruction is performed until execution of the instruction is complete (e.g., until the instruction completes its normal operation, until the instruction execution is terminated, until a timeout is reached, etc.)

In some examples, the example management endpoint interface 630 evaluates the result of the execution of the instruction to determine if the instruction completed as expected (as defined in the indication of the instruction received from the management endpoint 340 and/or in the definition file included in the package) (block 861). Upon determining that the result of the execution of the instruction does not match the expected result (block 861 returns a result of NO), the example management endpoint interface 630 may determine whether the execution of the instruction should be retried (block 862). In some examples, a retry counter is used to indicate a number of times that execution of the instruction has already been attempted. If the number of times that execution of the instruction has already been attempted is below a retry threshold, the example management endpoint interface 630 provides an updated status (e.g., retrying) to the management endpoint 340 (block 863). In some examples, additional information such as, the number of retries already performed, a description of the reason for the failure that caused the retry, etc. may additionally or alternatively be communicated to the management endpoint.

While in the illustrated example of FIG. 8, the instructions are re-executed as a result of a failure, in some examples, other responsive actions may be taken such as, a rollback of the execution of the instructions may be triggered (e.g., to return the component server 330 to a state prior to the failed execution of the instructions), an alert may be sent to an administrator to direct the administrators review into the failure, etc. Control then proceeds to block 850, where the instructions are re-executed. Blocks 850 through 863 are then repeated until an expected result is returned (block 861 returns a result of YES) or the retry threshold is exceeded (block 862 returns a result of NO).

Returning to block 862, if the example management endpoint interface 630 determines that the retry threshold is exceeded (block 862 returning a result of NO). The example management endpoint interface 630 provides an updated status (e.g., failed) to the management endpoint 340 (block 864). In some examples, additional information such as, the number of retries already performed, a description of the reason for the failure that caused the retry, etc. may additionally or alternatively be communicated to the management endpoint. Such additional information may be useful when diagnosing the failure. The results collected in the result cache 670 by the instruction executor interface 660 are transmitted to the management endpoint 340 by the management endpoint interface 630 (block 885). In this manner, results of the execution of the instruction(s) across multiple management agents are centralized to a single management endpoint 340 such that the management endpoint can report upon the status of the execution of the instruction(s) across the multiple management agents using a single interface.

Returning to block 861, when the execution of the instruction is complete and has returned an expected result (block 861 returns a result of YES), the example management endpoint interface 630 provides a status of the execution of the instruction to the management endpoint 340 indicating that execution of the instruction has completed (block 865). The results collected in the result cache 670 by the instruction executor interface 660 are transmitted to the management endpoint 340 by the management endpoint interface 630 (block 885).

While in the illustrated example of FIG. 8, the determination of whether to retry execution of the instruction (block 862) is made by the example management endpoint interface 630 (e.g., at the management agent 350), in some examples, the management endpoint interface 630 may consult the management endpoint 340 to determine whether execution of the instruction should be retried. Additionally or alternatively, the management endpoint 340 may, upon receipt of the results transmitted in connection with block 885, determine that the instructions did not produce an expected result, and may re-queue the instructions for execution in the instruction queue 530.

Returning to block 840, if the example instruction validator 650 determines that the instructions are not valid (e.g., block 840 returns a result of NO), the example management endpoint interface 630 provides a status update to the management endpoint 340 indicating that the instructions were rejected (block 870). In some examples, instead of informing the management endpoint 340 of the failure to validation of the instructions, control may return to block 830, where the example instruction retriever 640 may re-attempt obtaining the instructions and/or loading the instructions into the command cache 675. Such re-attempts may be performed up to, for example, a threshold number of re-attempts (e.g., three re-attempts, five re-attempts, etc.) before the example management endpoint interface 630 informs the management endpoint 340 of the rejected status of the instructions (block 870).

The example instruction executor interface 660 stores a result indicating that the validation failed in the result cache 670 (block 875). In some examples, the result indicates a reason for the failed validation (e.g., a checksum failure, a missing pre-requisite, a virus scan, etc.). In some examples, the example instruction retriever 640 unloads the instructions from the command cache 675 and/or deletes the package including the instructions from the instruction cache 620 (block 880). Unloading, deleting and/or otherwise removing the instructions from the command cache 675 and/or the instruction cache 620 ensures that instructions that failed validation (e.g., an instruction where a computed checksum did not match a checksum provided by the repository, an instruction that failed a virus scan, etc.) are not left on the component server 330 and/or loaded in memory of the management agent 350. In some examples, the instructions may be unloaded and/or removed regardless of whether the validation (of block 840) returns YES or NO. For example, the deletion of the instructions (block 880) may be performed after the results are sent to the monitoring endpoint 340 (block 885). Removing the instruction(s) reduces the likelihood that versioning issues might occur (e.g., a prior version of an instruction is executed despite a newer version being available at the repository 134). Removing the instruction(s) also reduces an amount of space within the instruction cache 620 utilized by such instructions. As a result, smaller instruction caches 620 may be utilized. When considered across the deployment environment 112, having hundreds or even thousands of copies of an instruction and/or package in each of the respective instruction caches can consume large amounts of storage space (e.g., a 1 MB instruction file stored one thousand times will consume approximately 1 GB of storage resources).

The results collected in the result cache 670 by the instruction executor interface 660 are transmitted to the management endpoint 340 by the management endpoint interface 630 (block 885). In this manner, results of the execution of the instruction(s) across multiple management agents are centralized to a single management endpoint 340 such that the management endpoint can report upon the status of the execution of the instruction(s) across the multiple management agents using a single interface. The example process 800 of FIG. 8 is then repeated periodically and/or aperiodically to solicit an indication of an instruction to be executed from the management endpoint 340.

Although the example program 800 of FIG. 8 is described in connection with executing instructions at a single management agent 350, the example program 800 of FIG. 8 implemented in accordance with the teachings of this disclosure can be used in a multi management agent scenario in which hundreds or thousands of management agents operate at the direction of the management endpoint 340. For example, while executing instructions in a manual fashion for such quantities of users would be overly burdensome or near impossible within required time constraints, examples disclosed herein may be used to distribute and execute large quantities of instructions in an efficient and streamlined fashion without burdening and frustrating end users with long wait times resulting from upgrades and/or operations performed by the instructions.

FIG. 9 is a flowchart representative of example machine-readable instructions that may be executed to implement the example management agent 350 of FIGS. 3A, 3B, 3C, and/or 6. The example process 830 of FIG. 9 begins at block 905 when the example instruction retriever 640 attempts to identify a package that includes the command specified in the indication of the instruction to be executed received from the management endpoint 340 (block 905). In examples disclosed herein, the example instruction retriever 640 attempts to identify the package by inspecting description files included with previously retrieved packages stored in the instruction cache 620. The example instruction retriever 640 determines whether the package is identified in the instruction cache 620 (block 910). If the package is identified in the instruction cache 620 (block 910 returns a result of YES), the example instruction retriever 640 loads the package and/or a portion thereof (e.g., a DLL file) into the command cache 675 (block 915). The instructions and/or commands implemented by the package may then be executed by the command executor 680. Returning to block 910, if the package is not identified in the instruction cache 620 (block 910 returns a result of NO), the example management endpoint interface 630 transmits a request for a package that implements the identified command to the management endpoint 340 (block 920). The example management endpoint 340 attempts to identify a package that implements the identified command, and responds with the identified package, a link to the identified package, or an error message. An example approach to attempting to identify the package at the management endpoint 340 is described below in connection with FIG. 10. The example management endpoint interface 630 evaluates the response received from the example management endpoint 340 (block 925). If the example management endpoint 340 responds with the package (block 925 returns a result of PACKAGE), the example instruction retriever 640 decompresses the package (block 930). If the example management endpoint 340 responds with a link to the package (block 925 returns a result of LINK TO PACKAGE), the example instruction retriever 640 retrieves the package from the identified link (block 928) and decompresses the package (block 930). If the example management endpoint 340 responds with the error message, no package is loaded (block 945).

When retrieving the instructions (block 928), the example instruction retriever 640 retrieves the package from the repository 134 as identified by the management endpoint 340. In some examples, the repository 134 is implemented by a file share. The example instruction retriever 640 retrieves the package by, for example, transmitting a request to the repository 134 and receiving one or more response messages including the package. However, any other approach to obtaining a package from a repository may additionally or alternatively be used. In the illustrated example of FIG. 9, the instructions are provided in a compressed format (e.g., as a .zip file). However, any other compression format may additionally or alternatively be used. The example instruction retriever 640 decompresses the instructions to an uncompressed state (block 930). Providing instruction packages in a compressed state is useful when, for example, the instructions are binary instructions for execution by the operating system of the component server 330, as such compression reduces data transmission requirements as well as storage requirements of the repository 134. In contrast, instructions that are formatted as script instructions (which may be, for example, only a few lines and/or bytes of instructions) for execution by a script interpreter such as the Microsoft™ PowerShell™ Framework might not be compressed because the storage space reduction does not outweigh the processing requirements on each of the component servers 330 to decompress the instructions. The example instruction retriever 640 stores the decompressed package (and/or the compressed package) in the instruction cache 620 (block 932).

In the illustrated example of FIG. 9, the example repository 134 and/or management endpoint 340, in addition to providing the package, also provides a checksum (e.g., an MD5 hash) to facilitate verification of the instructions. The example instruction validator 650 validates the retrieved package (block 935). Validating the package helps ensure that packages that were potentially corrupted during transmission are not inadvertently loaded into the command cache 675 and executed by the command executor 680. The example instruction validator 650 determines that the package is valid by, for example, computing a checksum of the retrieved package stored in the instruction cache 620 and comparing the computed checksum against the checksum provided by the repository 134 (and/or the management endpoint 340). However, any other validation scheme may additionally or alternatively be used.

If the example instruction validator 650 determines that the package is valid (block 940 returns a result of YES), the example package and/or a portion thereof is loaded into the command cache 675 for execution by the command executor 680 (block 915). If the example instruction validator 650 determines that the package is not valid (block 940 returns a result of NO), the package is not loaded into the command cache 675. Control then returns to block 840 of FIG. 8.

Figure 10:
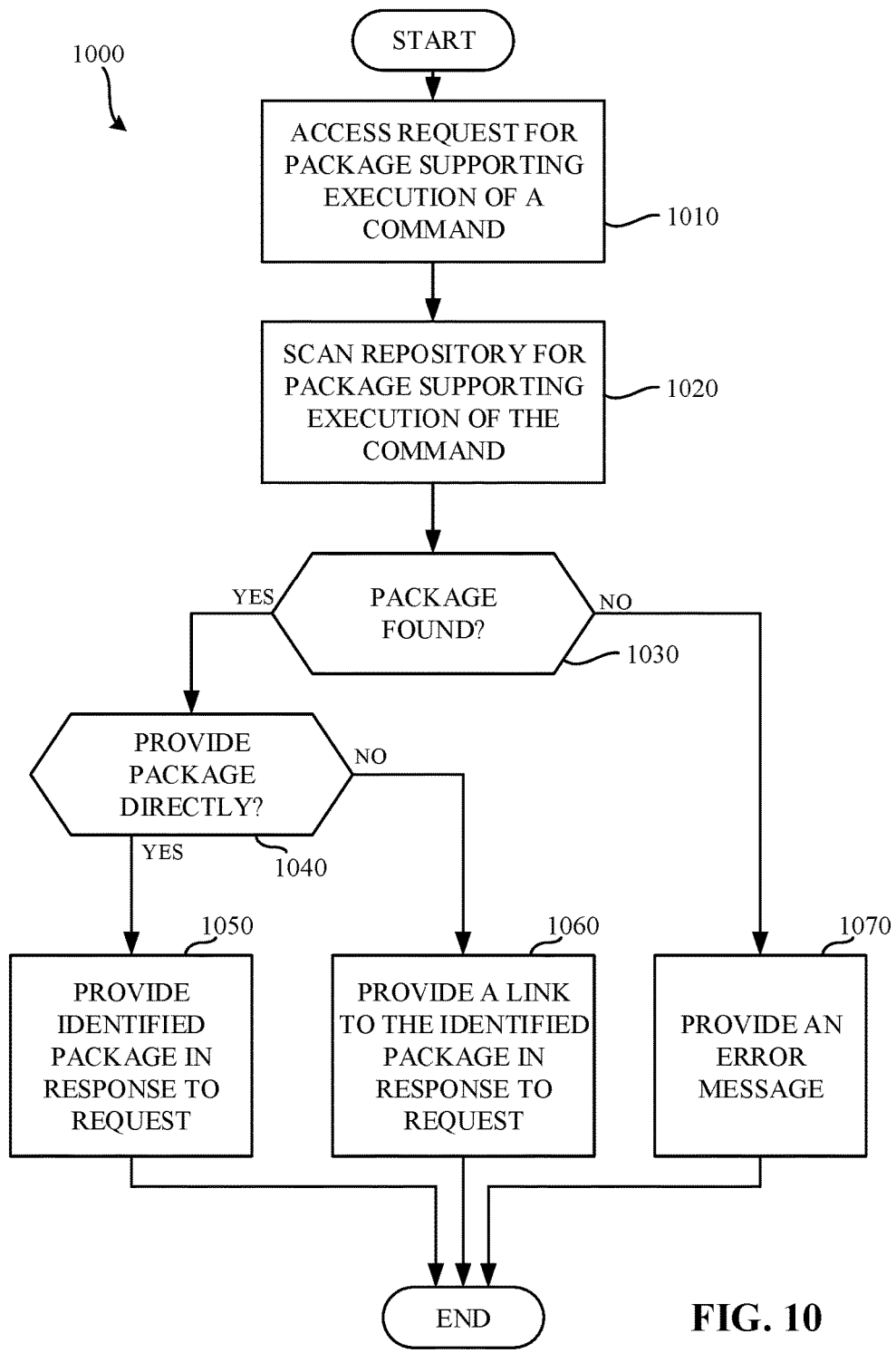
FIG. 10 is a flowchart representative of example machine-readable instructions that may be executed to implement the example management endpoint of FIGS. 3A, 3B, 3C, 4, and/or 5.

FIG. 10 is a flowchart representative of example machine-readable instructions that may be executed to implement the example management endpoint 340 of FIGS. 3A, 3B, 3C, 4, and/or 5. The example program 1000 of FIG. 10 begins when the package provider 560 receives a request for a package supporting execution of an identified command (block 1010). In the illustrated example of FIG. 10, the request is received via the management agent interface 510 and is routed to the package provider 560. In the illustrated example of FIG. 10, the request is received using a REST protocol. However, any other past, present, and/or future protocol and/or format may additionally or alternatively be used to request a package. The example package provider 560 scans the repository 134 for a package supporting execution of the command (block 1020). In some examples, the example package provider 560 scans the repository 134 for the package by inspecting a description file included in each package file that identifies the commands supported by the corresponding package file. However, any other approach to identifying a package based on a command may additionally or alternatively be used. For example, the example package provider 560 may maintain a look-up table that enables translation of the command to a package that supports execution of the command.

If the example package provider 560 identifies a package (block 1030 returns a result of YES), the example package provider 560 determines whether the package should be directly provided in response to the request. If the package is to be directly provided (block 1040 returns a result of YES), the example package provider 560 provides the identified package in response to the request (block 1050). If the package is not to be directly provided (block 1040 returns a result of NO), the example package provider 560 provides a link to the identified package in response to the request (block 1060). The determination of whether to provide the package directly in response to the request may be made in any manner. In some examples, the determination may be made based on whether the package is stored in a local repository (e.g., a repository implemented at the vA 320). If the package is stored at the local repository, the example package provider 560 provides the identified package in response to the request to reduce network communication overhead. If the package is not stored at the local repository (e.g., the repository 134 is located at a third-party site such as the third-party site 399 of FIG. 3C), the example package provider 560 provides the link to the identified package.

Returning to block 1030, if no package is found (block 1030 returns a result of NO), the example package provider 560 returns an error message in response to the request (block 1070). The example process 1000 of FIG. 10 then terminates.

Figure 11:
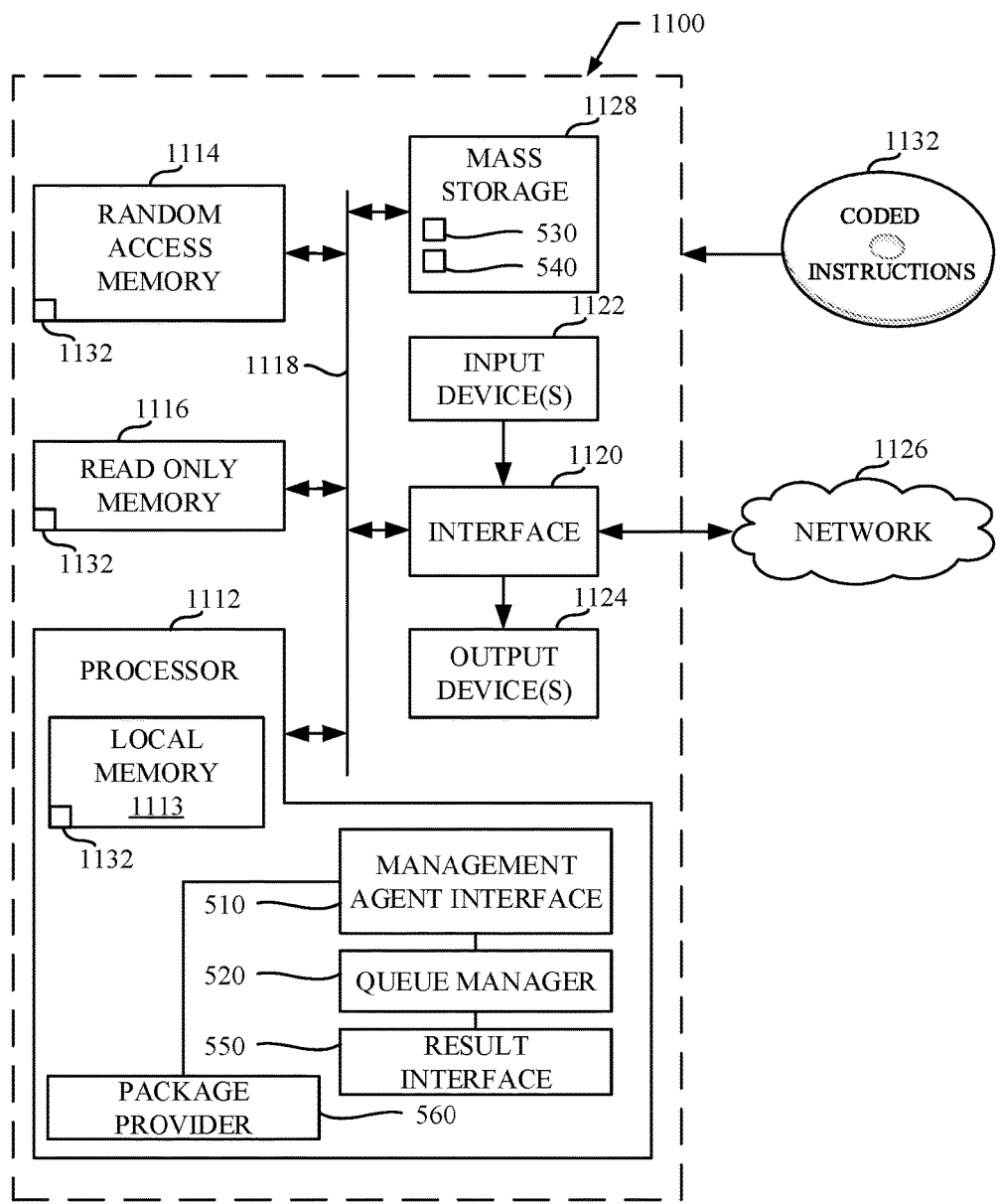
FIG. 11 is a block diagram of an example processing platform capable of executing the example machine-readable instructions of FIG. 7 to implement the example management endpoint of FIGS. 3A, 3B, 3C, 4, and/or 5.

FIG. 11 is a block diagram of an example processor platform 1100 capable of executing the instructions of FIG. 7 to implement the example management endpoint 340 of FIGS. 3A, 3B, 3C, 4, and/or 5. The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache), and executes instructions to implement the example management agent interface 510, the example queue manager 520, the example result interface 550, and/or the example package provider 560. The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include flash devices, floppy disk drives, hard drive disks, optical compact disk (CD) drives, optical Blu-ray disk drives, RAID systems, and optical digital versatile disk (DVD) drives. The example mass storage 1128 may implement the example instruction queue 530 and/or the example result data store 540.

Coded instructions 1132 representative of the example machine readable instructions of FIG. 7 may be stored in the mass storage device 1128, in the volatile memory 1114, in the non-volatile memory 1116, and/or on a removable tangible computer readable storage medium such as a CD or DVD.

Figure 12:
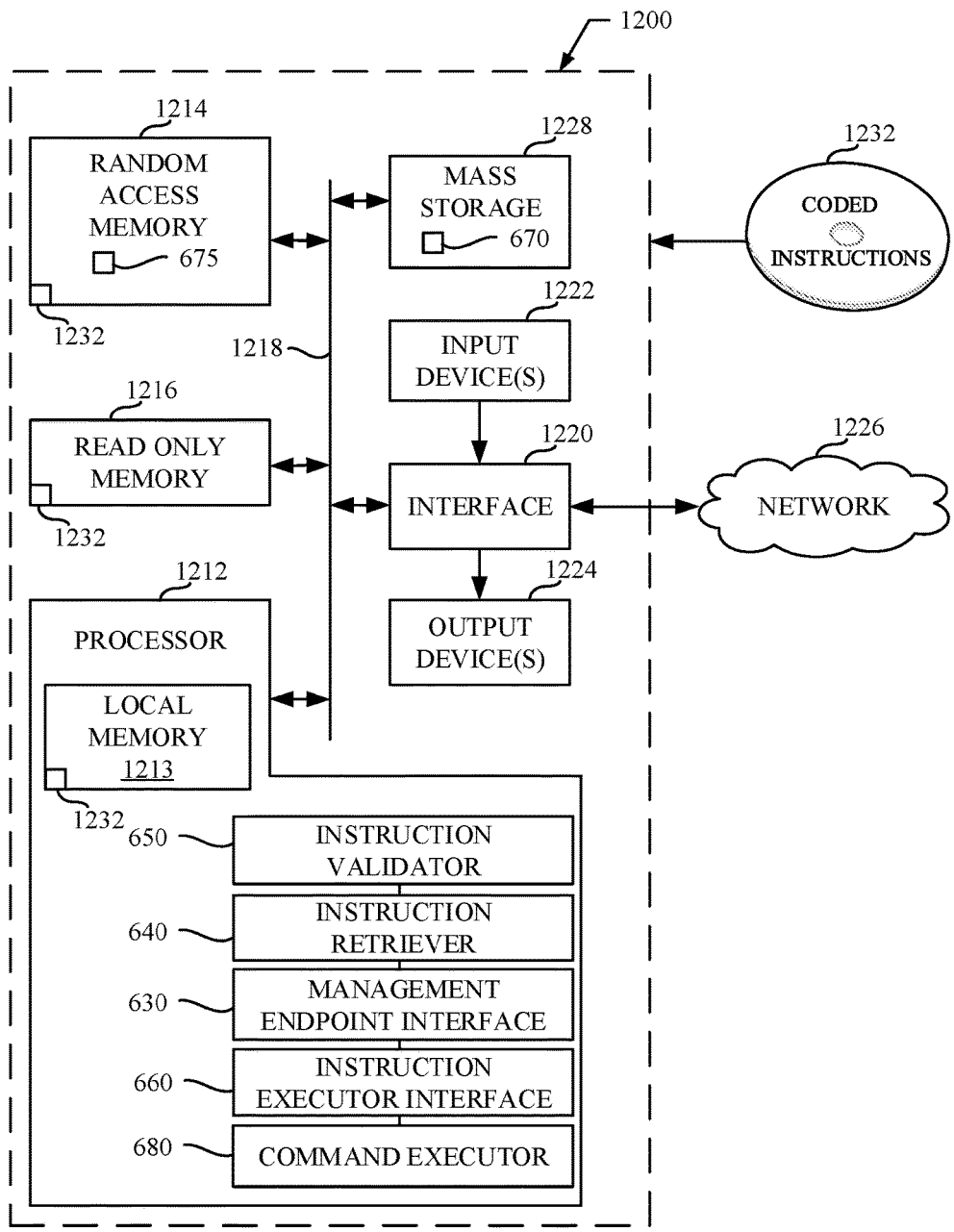
FIG. 12 is a block diagram of an example processing platform capable of executing the example machine-readable instructions of FIGS. 7 and/or 8 to implement the example management agent of FIGS. 3A, 3B, 3C and/or 6.

FIG. 12 is a block diagram of an example processor platform 1200 capable of executing the instructions of FIGS. 7 and/or 8 to implement the example management agent 350 of FIGS. 3A, 3B, 3C and/or 6. The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache), and executes instructions to implement the example management endpoint interface 630, the example instruction retriever 640, the example instruction validator 650, the example instruction executor interface 660, and/or the example command executor 680.

The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller. In the illustrated example of FIG. 12, the example random access memory 1214 implements the example command cache 675.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include flash devices, floppy disk drives, hard drive disks, optical compact disk (CD) drives, optical Blu-ray disk drives, RAID systems, and optical digital versatile disk (DVD) drives. The example mass storage device 1228 may implement the example result cache 670.

Coded instructions 1232 representative of the example machine readable instructions of FIGS. 7 and/or 8 may be stored in the mass storage device 1228, in the volatile memory 1214, in the non-volatile memory 1216, and/or on a removable tangible computer readable storage medium such as a CD or DVD.

From the foregoing, it will be appreciated that the above disclosed methods, apparatus and articles of manufacture enable deployment of instructions to component servers via management agents. In some examples, the instructions are formatted as a plugin that extends the functionality of the management agents. Such functionality enables instructions that might otherwise require execution external to the management agent (e.g., execution by an instruction executor such as the Microsoft™ PowerShell™ framework) to be implemented internal to the management agent 350. Using the plugin, some commands and/or instructions conveyed to the management agent by the management endpoint can be executed without interfacing with the external instruction executor. As a result, requirements for instruction frameworks of component servers are reduced, thereby reducing storage and/or processing requirements of the component servers. In the context of a deployment environment operating many component servers, such reductions enable additional component servers to be operated.

In some examples, the management agent is separate from an instruction executor of the component server. In this manner, the instruction executor can execute instructions that affect the operation(s) of the management agent. For example, the instruction executor may execute an instruction that causes the management agent to become updated and/or upgraded. Such functionality alleviates the need for a user (e.g., an administrator) to manually update each management agent of each component server. Such an approach is beneficial because, through the use of distributed execution of such installations, upgrades can be completed in a more timely fashion as compared to manual installation of an upgrade. In this manner, hundreds or thousands of management agents, for example, can rapidly be upgraded.

In some examples, instructions are retrieved by a management agent for execution at a component server from a repository. In some examples, the instructions are loaded into a command cache for execution by a command executor of the management agent. In some examples, upon completion of the execution of the instructions, the instruction(s) are unloaded from the command cache and/or removed from the component server. Removing the instruction(s) reduces the likelihood that versioning issues might occur (e.g., a prior version of an instruction is executed despite a newer version being available at the repository). Removing the instruction(s) also reduces an amount of space within the command cache and/or an instruction cache utilized by such instructions. When considered across the deployment environment, having hundreds or even thousands of copies of an instruction in each of the respective instruction caches can consume large amounts of storage space (e.g., a 1 MB instruction file stored one thousand times will consume approximately 1 GB of storage resources). Because of the removal of the instructions disclosed herein, smaller instruction caches may be utilized, resulting in lower system requirements for distributed deployment environments.

In some examples disclosed herein, instructions are provided to the management agent in a compressed format (e.g., as a .zip file). Providing instruction packages in a compressed state is useful when, for example, the instructions are binary instructions for execution at the component server, as such compression reduces data transmission requirements as well as storage requirements of the repository.

In some examples, the repository from which the management agent retrieves instructions for execution may be managed and/or operated by a third party organization (e.g., a professional service organization (PSO)) that manages and/or develops instructions (e.g., develops executable code, develops workflows, etc.). Such an approach enables an administrator of the deployment environment to easily work with third party software providers (e.g., consultants, PSOs, etc.) that create instructions (e.g., executable files) that may be customized for the deployment environment. In this manner, the administrator can simply direct the management endpoint to cause the management agents to retrieve the instructions from a repository hosted by the third party organization, and execute those instructions. Such an approach alleviates storage needs within the deployment environment. Such an approach also facilitates more rapid development and deployment of instructions.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
a management endpoint interface to access an indication of an instruction to be executed, the indication of the instruction to be executed provided by a management endpoint within a deployment environment;
an instruction retriever to request a package supporting execution of the instruction from the management endpoint, the instruction retriever to cause a first component of the package to be loaded into a command cache, the first component of the package including a first instruction to implement a plugin framework, the instruction retriever to cause a second component to be loaded into an instruction cache separate from the command cache, the second component including a second instruction to affect the operation of the apparatus;
a command executor to execute the first instruction from the command cache, the command executor to collect a first result of the execution of the first instruction, the management endpoint interface to transmit the first result of the execution of the first instruction to the management endpoint; and
an instruction executor interface to cause an instruction executor separate from the apparatus to execute the second instruction from the instruction cache and provide a second result to be stored in a result cache.

2. The apparatus as described in claim 1, further including an instruction validator to validate the package retrieved by the instruction retriever.

3. The apparatus as described in claim 2, wherein the instruction validator is to validate the package by computing a first checksum of the first instructions retrieved by the instruction retriever and by comparing the first checksum to a second checksum provided by the management endpoint.

4. The apparatus as described in claim 1, wherein the management endpoint is to direct the instruction retriever to retrieve the package from a repository operated by a professional services organization.

5. The apparatus as described in claim 1, wherein the instruction executor is to execute the second component of the package in a separate execution space from the command executor.

6. The apparatus as described in claim 1, wherein the instruction retriever is to retrieve the package in a compressed format, and the instruction retriever is to decompress the compressed package into a decompressed format.

7. The apparatus as described in claim 6, wherein the first component of the package to be loaded into the command cache is a plugin.

8. The apparatus as described in claim 1, wherein the instruction retriever is to store the package in a file system prior to causing the first component of the package to be loaded into the command cache.

9. A method for distribution and execution of instructions, the method comprising:
accessing, by executing a first instruction with a processor within a deployment environment, an indication of a second instruction to be executed and an indication of a third instruction to be executed, the indication of the second instruction to be executed provided by a management endpoint within the deployment environment;
requesting a package to support execution of the second instruction from the management endpoint;
loading a first component of the package into a command cache, the first component of the package including the second instruction to be executed, the command cache implemented by a plugin framework;
loading a second component of the package into an instruction cache, the second component of the package including the third instruction to be executed;
executing the second instruction from the command cache, executing the third instruction from the instruction cache;
collecting a first result of execution of the second instruction, collecting a second result of execution of the third instruction; and
transmitting the first result and the second result to the management endpoint.

10. The method as described in claim 9, further including retrieving the package from a repository located outside of the deployment environment, the repository located outside of the deployment environment to facilitate instructions being provided by a professional services organization.

11. The method as described in claim 10, further including validating the retrieved package.

12. The method as described in claim 11, wherein the validating of the package includes:
computing a first checksum of the retrieved package; and
comparing the first checksum to a second checksum provided by the repository.

13. The method as described in claim 9, wherein the package is retrieved in a compressed format, and further including decompressing the compressed package into a decompressed format.

14. The apparatus as described in claim 1, wherein the package includes a description file identifying instructions for which the package supports execution.

15. The method as described in claim 9, further including storing the package in a file system prior to causing the component of the package to be loaded into the command cache.

16. A non-transitory computer readable medium comprising first instructions which, when executed, cause a processor within a deployment environment to at least:
access an indication of a second instruction to be executed, the indication of the second instruction to be executed provided by a management endpoint within the deployment environment;
request a package supporting execution of the second instruction from the management endpoint;
load a first component of the package into a command cache, the first component of the package including the second instruction to be executed, the command cache implemented by a plugin framework;
access an indication of a third instruction to be executed;
load a second component of the package into an instruction cache, the second component of the package including the third instruction to be executed;
execute the second instruction from the command cache;
collect a first result of the execution of the second instruction;
collect a second result of execution of the third instruction; and transmit the first result and the second result to the management endpoint.

17. The non-transitory computer readable medium as described in claim 16, wherein the first instructions, when executed, cause the processor to retrieve the package from a repository located outside of the deployment environment, the repository located outside of the deployment environment to facilitate instructions being provided by a professional services organization.

18. The non-transitory computer readable medium as described in claim 17, wherein the first instructions, when executed, further cause the processor to validate the retrieved package by:
   computing a first checksum of the retrieved package; and
   comparing the first checksum to a second checksum provided by the repository.

19. The non-transitory computer readable medium as described in claim 16, wherein the package is retrieved in a compressed format, and the first instructions, when executed, further cause the processor to decompress the package into a decompressed format.

20. The non-transitory computer readable medium as described in claim 19, wherein the first instructions, when executed, further cause the processor to direct an instruction executor output of the deployment environment to execute the decompressed instructions.

21. The non-transitory computer readable medium as described in claim 16, wherein the first instructions, when executed, further cause the processor to store the package in a file system prior to causing the component of the package to be loaded into the command cache.

\* \* \* \* \*

UNITED STATES PATENT AND TRADEMARK OFFICE
CERTIFICATE OF CORRECTION

| | |
|---|---|
| PATENT NO. | : 10,235,296 B2 |
| APPLICATION NO. | : 15/370790 |
| DATED | : March 19, 2019 |
| INVENTOR(S) | : Dimitar Ivanov et al. |

Page 1 of 1

It is certified that error appears in the above-identified patent and that said Letters Patent is hereby corrected as shown below:

On the Title Page

Item (72), Third inventor's Name:
Replace "George Dmitriov" with "George Dimitrov"

Signed and Sealed this
Seventh Day of May, 2019

Andrei Iancu
*Director of the United States Patent and Trademark Office*